United States Patent [19]

Heiberger et al.

[11] 4,378,592
[45] Mar. 29, 1983

[54] COMPUTER DIRECTED LOADING AND UNLOADING DEVICES

[75] Inventors: Francis E. Heiberger, Elmhurst; Carl E. Tack, Jr., Glen Ellyn, both of Ill.

[73] Assignee: Danly Machine Corporation, Chicago, Ill.

[21] Appl. No.: 297,264

[22] Filed: Aug. 28, 1981

Related U.S. Application Data

[63] Continuation-in-part of Ser. No. 182,754, Aug. 29, 1980, abandoned.

[51] Int. Cl.³ .................................... G06F 15/46
[52] U.S. Cl. .................................... 364/476; 100/207; 364/478
[58] Field of Search .............. 364/474, 475, 476, 478, 364/468, 469; 100/43, 99, 102, 137, 138, 139, 140, 193, 207; 29/430; 198/339, 341, 610; 414/621

[56] References Cited

U.S. PATENT DOCUMENTS

| | | | |
|---|---|---|---|
| 3,199,443 | 8/1965 | Danly | 100/207 |
| 3,407,724 | 10/1968 | Heiberger | 100/207 X |
| 3,557,686 | 1/1971 | Sapolsky | 100/43 |
| 3,948,162 | 4/1976 | Numba | 100/207 X |
| 4,279,561 | 7/1981 | Schneider et al. | 100/207 X |

FOREIGN PATENT DOCUMENTS

| | | | |
|---|---|---|---|
| 2010713 | 12/1978 | United Kingdom | 100/207 |
| 2011860 | 12/1978 | United Kingdom | 100/207 |

Primary Examiner—Joseph F. Ruggiero
Attorney, Agent, or Firm—Leydig, Voit, Osann, Mayer & Holt, Ltd.

[57] ABSTRACT

A power press arrangement including one or more workpiece handling mechanisms such as loaders, unloaders, turnover devices, conveyors, etc. The various workpiece handling mechanisms are controlled in synchronism with the press or presses through numerical control systems which are coordinated with press slide positions. For each axis of controlled movement, a discrete number of desired position locations are loaded into an associated press control memory, and the data is processed into a derived motion table for each axis and followed to effect axis motion in coordination with press slide position. During operation of the press, the associated control system continuously derives motion control parameters for the controlled axes based upon the tabular values. The actual position of each controlled mechanism is also monitored and compared with the desired position at repetitive time increments to detect any position errors. A desired velocity for each controlled mechanism is also derived from the desired position signals, and the mechanism is driven at a velocity which is a function of both the desired velocity and any position error.

23 Claims, 24 Drawing Figures

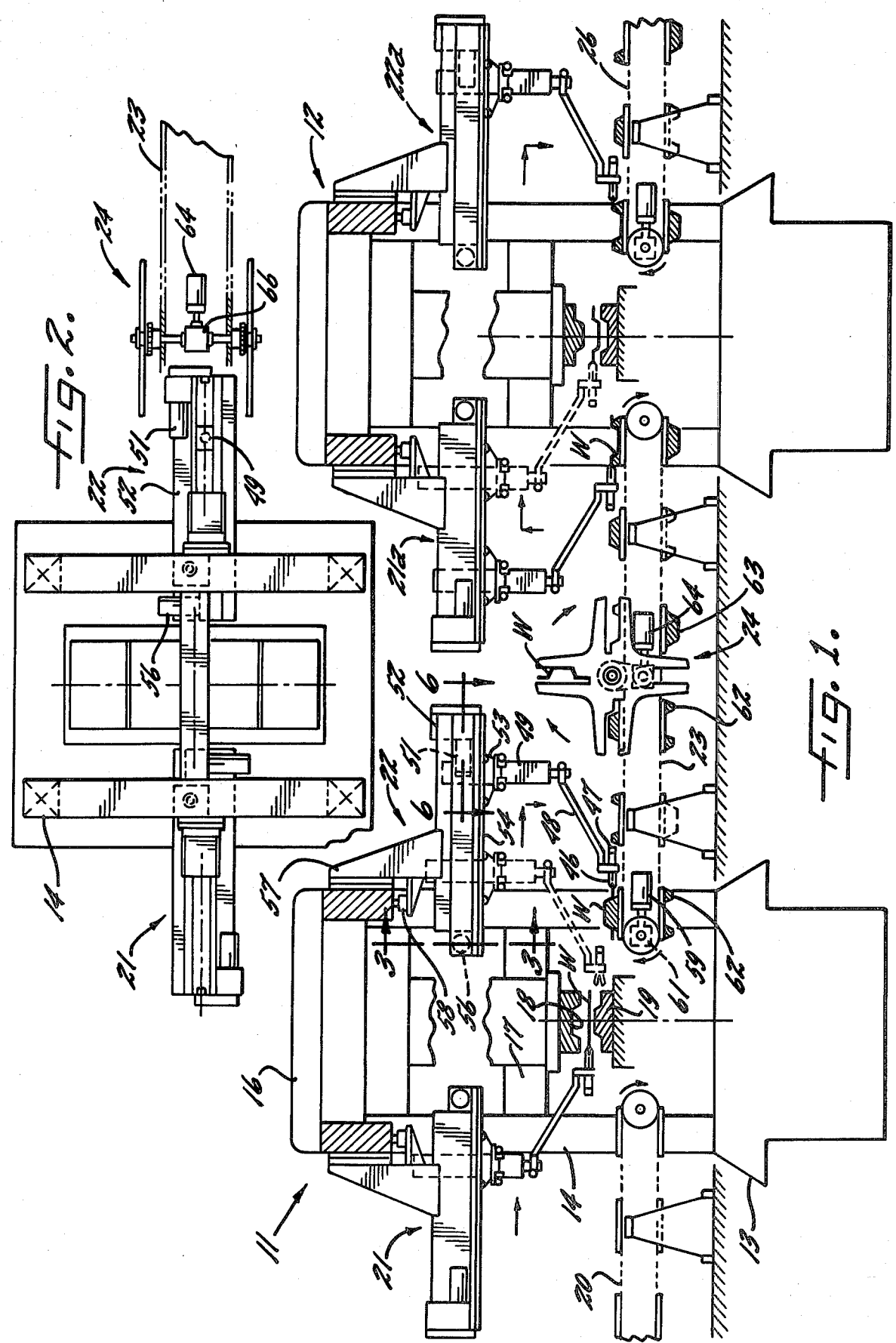

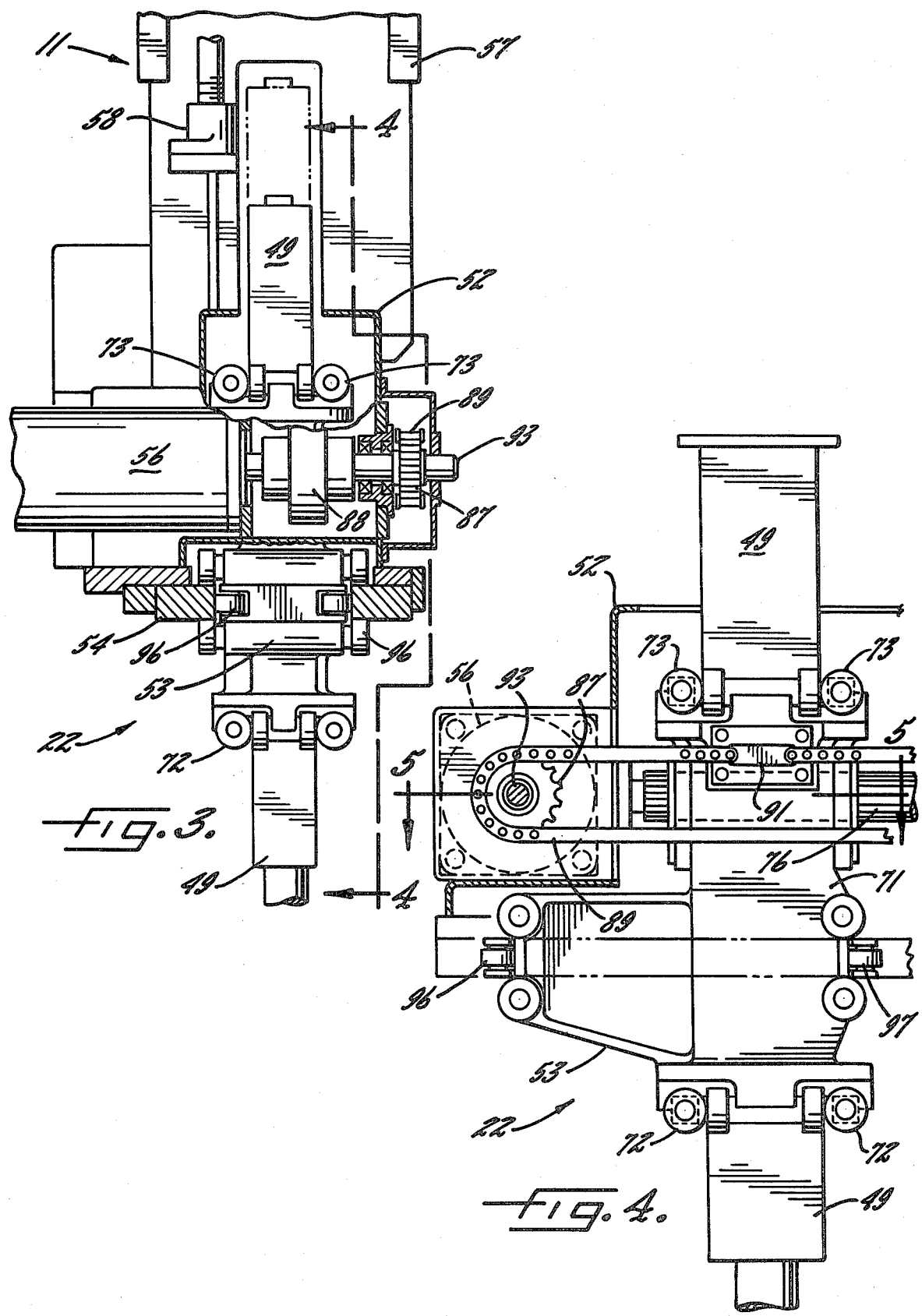

| PRESS POSITION | LOADER HORIZ. | LOADER VERT. | UNLOADER HORIZ. | UNLOADER VERT. | CONVEYOR | TURNOVER |
|---|---|---|---|---|---|---|
| 0 | | | | | | |
| 1 | | | | | | |
| 2 | | | | | | |
| 3 | | | | | | |
| 4 | | | | | | |
| 5 | | | | | | |
| 494 | | | | | | |
| 495 | | | | | | |
| 496 | | | | | | |
| 497 | | | | | | |
| 498 | | | | | | |
| 499 | | | | | | |

COMPUTER DIRECTED LOADING AND UNLOADING DEVICES

CROSS-REFERENCE TO RELATED APPLICATION

This application is a continuation-in-part of our copending application Ser. No. 182,754 filed Aug. 29, 1980, abandoned, for "Computer Directed Loading and Unloading Device."

DESCRIPTION OF THE INVENTION

This invention relates generally to power presses and more particularly concerns a control system synchronized therewith for intervening auxiliary mechanisms such as loaders, unloaders and conveyors.

In synchronized press lines there are intermediate mechanisms for transferring work pieces from one press to another. Such transfer mechanisms include loaders for loading workpieces into the working areas of the presses and unloaders for removing the workpieces after a press operation. Other devices include conveyors for moving workpieces between presses and turnover mechanisms for reorienting a workpiece after one press operation and prior to a subsequent press operation.

As shown in Danly U.S. Pat. No. 3,199,443, the drives for power presses may be centrally synchronized and the various transfer mechanisms operated by cams associated with the individual presses. A difficulty with cam operated transfer mechanisms is a long engineering and design lead time for development of the cams. Several months are required from the time at which the transfer mechanism cams are engineered until the cams are available for actual use on a press. In addition, while there are difficulties in original cam design, the redesign of cams for an existing transfer mechanism drive (in order to change the transfer mechanism motion) is even more difficult.

Considerable work is also required to retrofit cam transfer mechanisms onto an existing press. It is also difficult to utilize a cam driven transfer mechanism arrangement on a below-floor type of press.

Microprocessor-based controls for transfer mechanisms are known, as are numerically controlled drives for such mechanisms. Typically such controls for transfer mechanisms are programmed for transfer mechanism motion independent of the operation of the associated press, although some press positin information might be utilized such as to set limit conditions for the extreme position of a loader or unloader mechanism.

It is desirable, particularly in the case of an automated power press line, to substantially coordinate the motion of the transfer mechanisms with the press operation. It is further desirable to accomplish this coordination without the use of the above described cams, in order to avoid the long engineering lead times associated therewith.

It is therefore an object of the present invention to provide an electrical control arrangement for transfer mechanisms for use with a power press wherein the transfer mechanisms' motions are coordinated with the press positions.

It is a further object of this invention to provide such a control arrangement wherein, in a line of synchronized power presses, the transfer mechanisms' motions are coordinated with press positions.

Further objects and advantages of the present invention will be apparent upon reading the following detailed description and upon reference to the drawings, in which:

FIG. 1 is a side elevation, partially diagrammatic, showing a portion of a press line with transfer mechanisms controlled in accordance with the present invention;

FIG. 2 is a top view of one of the presses and associated transfer mechanisms of FIG. 1;

FIG. 3 is an end view of an unloader mechanism of FIG. 1 taken along the line 3—3 and in the direction of the arrows;

FIG. 4 is a side view of the unloader mechanism of FIG. 3 taken along the lines 4—4 and in the direction of the arrows;

Figure 1A:
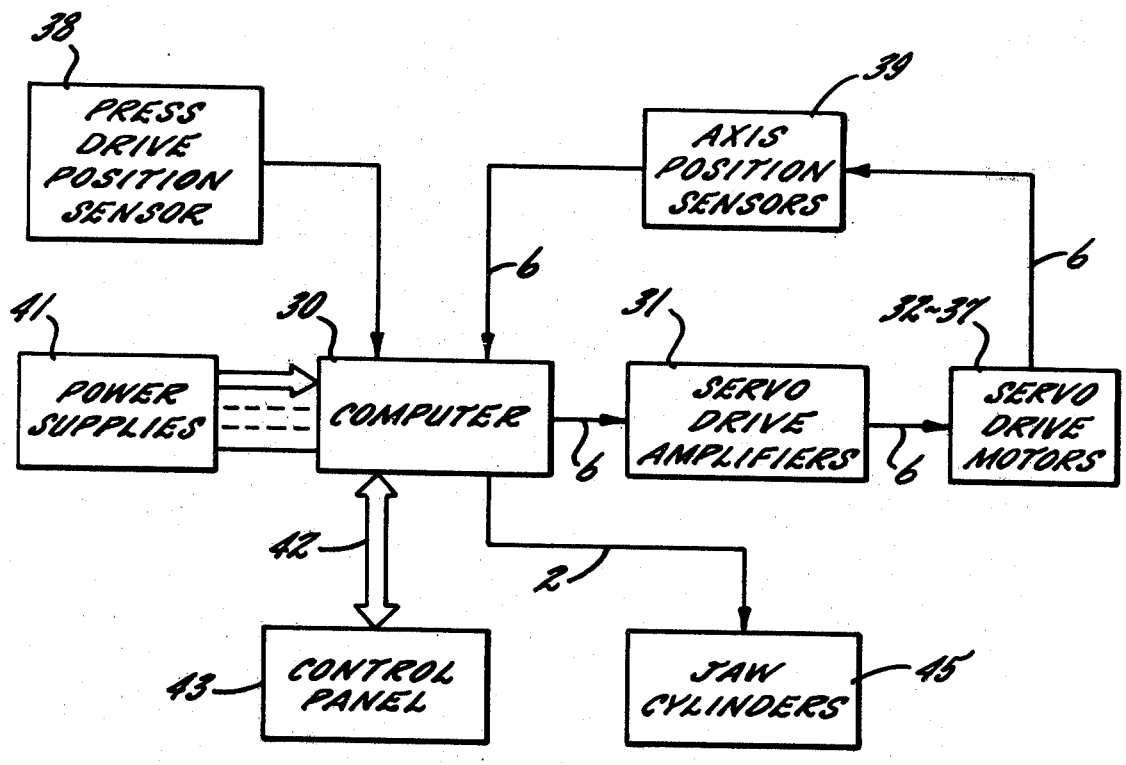
FIG. 1a is a block diagram of the computer and servo interconnections for a transfer mechanism control system in accordance with the present invention.
Figure 5:
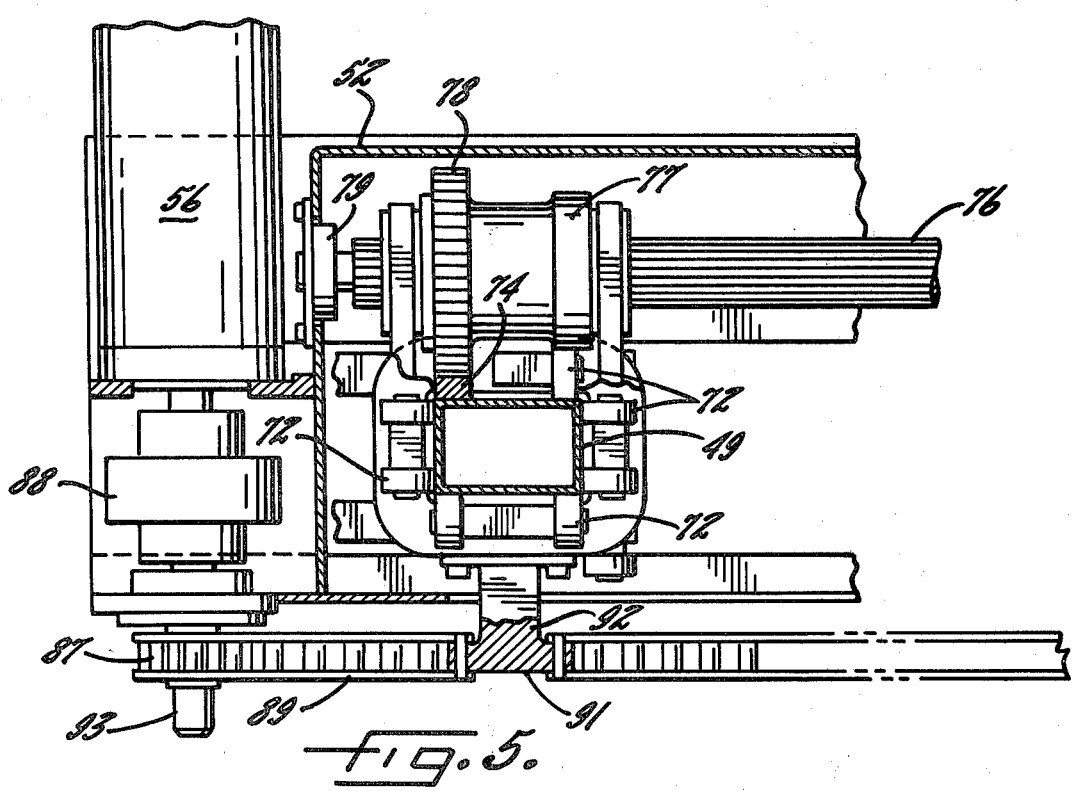
FIG. 5 is a top view, partially in section, of a portion of the unloader mechanism of FIG. 4 taken along the line 5—5 and in the direction of the arrows.
Figure 6:
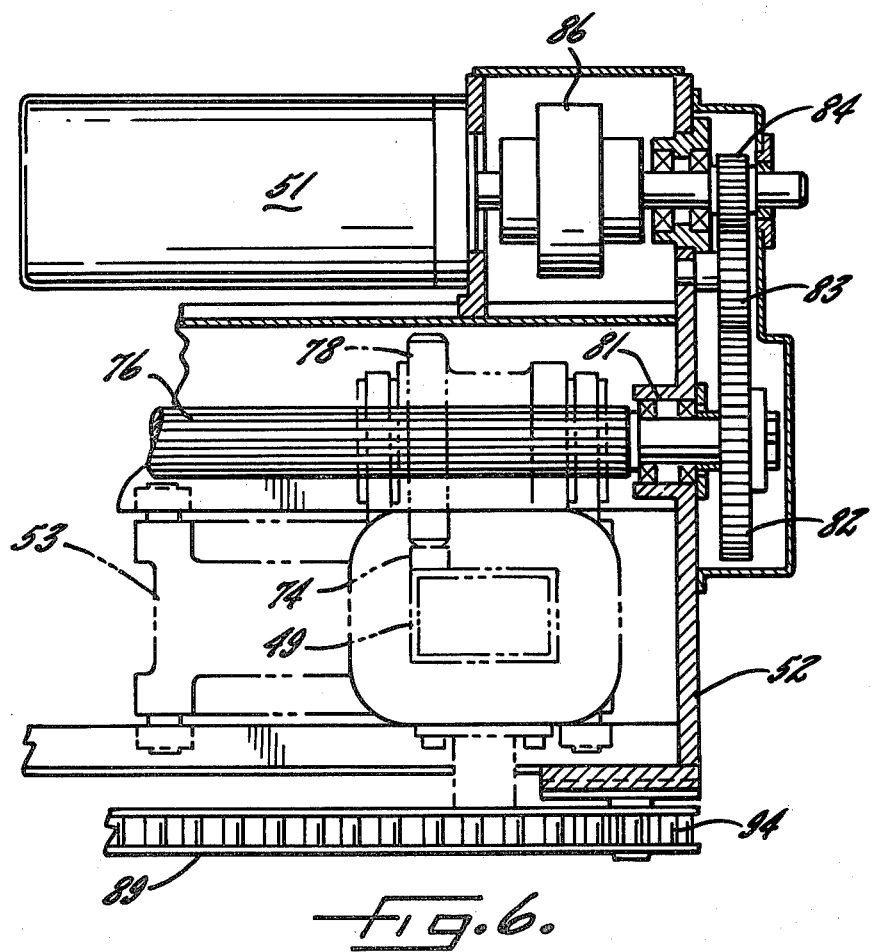
FIG. 6 is a top view, partially in section, of another portion of the unloader of FIG. 1, taken along the line 6—6 and in the direction of the arrows.

Referring initially to FIG. 1, an automated press line 10 includes a pair of power presses 11 and 12. Each press is shown substantially identical to the other, although this is not necessary in practicing the invention. Similarly, although two exemplary presses 11 and 12 are shown, any number of presses may be incorporated into the automated press line 10.

The press 11 includes a base 13 and an upstanding frame 14 topped by a crown 16. A slide 17 is received for reciprocation in the frame 16 and carries an upper die 18. A lower die 19 is positioned to cooperate with the upper die 18 as it reciprocates in the frame 14 to form workpieces W in the operation of the press 11. The press 11 may be a conventional over-drive or under-drive press. Typically such drives are eccentric drives actuated by a motor which, through the eccentric mechanism, effects one complete reciprocation of the slide 17 in one complete 360° rotation of the motor shaft. Details of such conventional press drive systems have been omitted from the figures in order to enhance the clarity of the description of the auxilary equipment associated with the presses.

Associated with the press 11 is a loader 21 for removing work pieces from a conveyor 20 and for moving the workpieces into the working area of the press between the upper and lower dies 18 and 19. Also associated with the press 11 are an unloader mechanism 22 which removes the workpieces W after the press operation and places them on a conveyor 23, and a workpiece turnover device 24 which is operated in conjunction with the output conveyor 23.

Associated with the press 12 are a loader 21a substantially identical in structure to the loader 21 and an unloader 22a substantially identical in structure to the unloader 22. The conveyor 23 serves as the input conveyor for the press 12, and the press 12 has an associated output conveyor 26. As indicated previously, the press 12 may be identical to the press 11; or it may be of a different type, depending upon the operation to be performed on the workpieces by the press.

In the illustrated press line, each press controls two axes of movement of the loader, two axes of movement of the unloader, the movement of the output conveyor, and the rotation of the turnover mechanism along the output conveyor. Before considering the structure and operation of these auxilary devices in greater detail, the control system for the devices shall be briefly described. With reference to FIG. 1a, a computer 30 produces control signals for each of six servo-drive amplifiers 31: one for each axis of the loader and unloader, one for the output conveyor, and one for the turnover mechanism. For example, for the press 11 a computer control signal is produced for each of two loader servos, two unloader servos, a conveyor servo and a turnover mechanism servo. In the illustrated press line, the servo-drive amplifiers receive an analog signal which is produced by the computer 30 through a digital-to-analog conversion. Each of the servo-drive amplifiers 31 drives one of the servo-motors, which servo-motors are designated collectively as 32–37.

The digital computer 30 receives position information from a press drive position sensor 38, which constantly monitors the angular position of the press drive motor shaft. Based upon this position information for the press drive, and consequently for the press slide, the computer 30 derives desired position servo-signals for the servo-drive amplifiers 31. In the present instance, a table is prepared during the set-up operation of the computer with the desired positions for each of the auxiliary device axes written into the table and coordinated therein with press drive positions. During normal operation of the press, the computer 30 derives intermediate position values for the servo-drive amplifier signals based upon the table values.

In order to complete each of the servo loops with the drive motors 32–37, an axis position sensor 39 is associated with each of the servo-drive motors, and these axis position sensors continuously feed back to the computer 30 signals representing the actual positions of servo drives. The computer compares the desired axis positions derived from the press position tables with the actual axis positions to continuously update the servo-drive amplifier input signals.

The computer 30 is operable to activate the opening and closing of the jaw cylinders associated with the loader and unloader mechanisms. The jaw cylinders, designated jointly as 45, are each activatable by an appropriate signal at the desired point in the press drive cycle. The computer 30 also receives conventional supply voltages from power supplies 41, and interacts on a bus 42 with a control panel 43. The control panel includes means for entering desired axis positions into the computer, and displays for indicating positions of devices and of the press drive during operation. Illustrative flow charts for representative operations of the computer 30 shall be discussed in more detail hereinafter. The computer routines will be discussed in coordination with the computer's interraction with the sensors 38 and 39 and the control panel 42. In addition, an illustrative control panel 43, and the functions of the component parts thereof, shall also be discussed in more detail.

Returning now to FIGS. 1 through 6, the mechanical operation of the auxiliary equipment for the press 11 shall be discussed in further detail. In the mechanical illustrations of the transfer mechanisms of FIGS. 1 through 6, the servo-drive motors 32 through 37 are shown together with their mechanical couplings to the transfer mechanisms. The various position sensors for feeding back motor shaft position to the computer and the servo-drive amplifiers coupling drive voltages to the servo-drive motors are not shown. Nor are the computer 30 or control panel 43 shown in the FIGS. 1 through 6. In the examplary embodiment, one computer and associated amplifiers, press drive position sensor, etc., are associated with each press such as 11 or 12. With initial reference to FIGS. 1 and 2, the unloader mechanism 22 includes a pair of jaws 46 actuable to be opened and closed by an air cylinder 47. The jaws 46 and the air cylinder 47 are mounted at the lower end of an arm 48, the upper end of which is attached to the bottom of a post 49. The arm 48 and jaws 46 on the post 49 are driven vertically, relative to a support bracket 52, by a vertical axis servo motor 32.

In order to move the jaws 46 and arm 48 horizontally, the post 49 is received in a post container mounted on a trolley 53 which is moveable on tracks 54 on the base of the support bracket 52. A horizontal axis servo drive motor 33 mounted on the bracket 52 drives the trolley 53 by means of a chain drive arrangement, which shall be described hereinafter. The post 49, which extends above the trolley 53, is free in its horizontal travel to pass through an opening in a bracket support 57 so that the pair of jaws 46 may be moved into and out of the working area of the press 11. The support 57 is slidably mounted on the side frame of the press 11 and is, prior to the operation of the unloader 22, adjustable by a height adjustment 58. Adjusting the height of the support 57 adjusts the vertical height of the support bracket 57 in order to position the jaws 46 at the proper height for a particular press set up.

The loader mechanism 21 is substantially identical to the unloader 22, and therefore shall not be described in detail. Like the unloader 22, the loader 21 is operable to move a pair of jaws in the x (horizontal) and z (vertical) directions. Together the axes of the loader 21 and the unloader 22 comprise four of the six axes controlled by the computer 30 associated with the press 11. The fifth axis is the drive for the conveyor 23 at the output of the press 11, which also serves as the input conveyor for the press 12. A conveyor motor 36 drives the conveyor 23 through a drive mechanism 61. The conveyor 23 includes flights 62 and 63 of opposite contours for receiving the workpieces W from the press 11 and the turnover mechanism, respectively.

The turnover mechanism 24 inverts the workpieces W so that they are reoriented and transferred from flight 63 to flight 62, properly positioned to be received into the press 12. The sixth axis controlled by the computer 30 is the turnover mechanism drive comprising a turnover drive motor 37 driving the turnover mechanism through a gear box 66. The mechanism for a suitable turnover device is shown in U.S. Pat. No. 3,342,125. In the present instance, the angular position of the motor drive axis is monitored by an axis position sensor and coupled to the computer 30, and the motor 37 is a servo-drive motor responsive to a servo signal provided by the computer 30.

A typical unloader 22, which as mentioned previously is substantially identical to a typical loader such as 21, shall now be described in further detail. With particular reference to FIGS. 3 through 6, the post 49 carrying the jaw arm 48 is received for vertical movement in a post container 71. The post 49 is positioned in the post container 71 by a group of lower rollers 72 and a group of upper rollers 73. In order to drive the post 49 vertically relative to the post container 71, a vertical rack 74 is attached along one side of the post. The vertical motor 32 drives a spline shaft 76 to effect the raising and lowering of the post 49. The spline shaft 76 rotatably drives a clutch assembly 77 which is slidably mounted on the spline shaft for horizontal translation relative thereto. Rotation of the spline shaft 76 rotates the clutch assembly 77 and a gear 78 carried thereon which engages the rack 74. Rotation of the gear 78 raises and lowers the rack 74 and the attached post 49. The spline shaft 76 is rotatably mounted in the fixed frame 52. The spline shaft 76 is rotatably mounted at one end in a bearing 79 and at the other end is rotatably mounted in a bearing arrangement 81 and driven by a gear 82, which is a portion of a gear reduction assembly also including gears 83 and 84. The gear 84 is rotatably driven by the vertical motor 32 through a clutch 86.

The post 49, post housing 71, clutch assembly 77, and roller assemblies 72 and 73 are free to move horizontally as driven by the horizontal motor 33. The horizontal motor 33 drives a sprocket 87 through a clutch assembly 88. The sprocket 87 drives a chain 89, joined at its ends by a T-shaped bar 91 having a stem portion 92 attached to the post container 71. The sprocket 87 is rotatably mounted on a shaft 93 which is fixed on the stationary bracket 52. The other end of the chain is mounted on a sprocket rotatably mounted on a shaft 94 which is likewise fixed to the bracket 52. As the chain 89 is rotated by the horizontal motor 33, the link 91 and attached post container 71, carrying the vertically moveable post 49, are translated horizontally. The lower portion of the post container 71 forms the trolley 53 which carries roller assemblies 96 and 97 which run on rails 54 for horizontal movement of the post container 71.

As can be seen, the combined horizontal and vertical motion imparted to the post 49 permits two-dimensional maneuverability of the unloader arm 48 carrying the jaws 46. By suitably programming the operation of the horizontal motor 33 and the vertical motor 32 the two axes of the unloader 22 may be controlled to cooperate with a particular press operation to remove formed work pieces from the press 11. As indicated previously, the corresponding two axes for the loader 21 may be similarly controlled as may the conveyor motor 36 and the turnover apparatus motor 37. In addition the "openclose" command signals for the air cylinders operating the jaws for the loader and unloader are provided by the computer at the programmed press drive positions.

Figure 7:
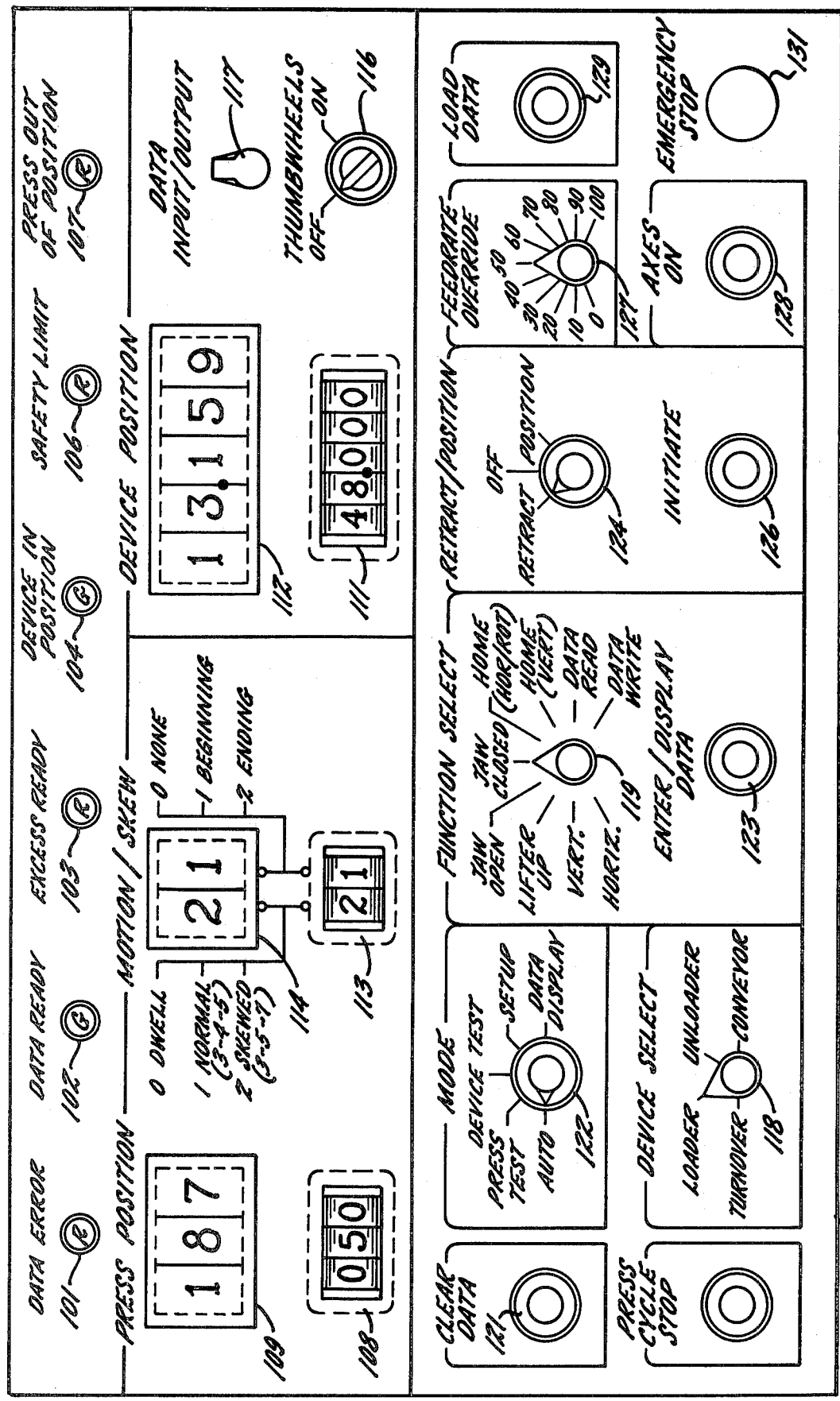
FIG. 7 is an illustration of a control panel for the transfer mechanism control system.

Referring now to FIG. 7, an exemplary control panel 43 for entering and displaying transfer mechanism control information to and from the computer 30 shall be described in detail. The various controls and indicators on the control panel are primarily used for the entry of axis position information to the computer 30 and for display of position information for the various axes, such as during operation of the press and transfer mechanisms. Following the description of the control panel 43, exemplary data entry and operation flow charts for the computer 30 shall be discussed, with reference to the control panel as discussed hereinbelow.

Across the top of the control panel 43 are six warning lights. A "data error" light 101 indicates that invalid or out-of-tolerance data, such as an impossible unloader x axis position, has been entered. A "data ready" light 102 indicates the completion of processing of entered data, such as processing axis data into tabular form for subsequent operation of the press control system. An "excess error" light 103 indicates that one of the devices associated with one of the six axes has fallen outside of its tolerance limit of path error during press operation.

A "device in position" light 104 indicates when a device is in its synchronized or retracted position. A "safety limit" light 106 indicates that one of the devices on a controlled axis has reached a safety limit position during operation. A "press out of position" light 107 indicates that the press and the controlled devices are out of synchronization with one another.

Below the row of indicator lights are a group of data entry and display devices for entering transfer device positions relative to press angular positions. Included among the controls and displays are thumbwheel arrangements 108 for press position, 113 for motion and skew, and 111 for device position. The device position thembwheels are operable to set positions for a selected one of the six axes of controlled devices. Typically, one set of axis positions for a press cycle is entered, and then the next set, until all six axes have been entered.

Associated with each of the thumbwheel arrangements are displays including a display 109 for press position, motion/skew display 114, and device position display 112. As illustrated, a series of points such as for the x axis of the unloader 22 (FIGS. 1 through 6) are being entered relative to angular press positions corresponding to each point. The motion/skew control and indication is for the type of motion to move from one point to another.

For example, the previously entered device position information is shown in the displays 109, 114 and 112. The press position display 109 indicates that the previously entered device position was at a press position of 187°, (with 0° corresponding to top dead center for the press drive). The display 112 indicates a device position such as 13.159 inches from a rest or home position for the unloader in the x direction. The type of motion used to reach this position is indicated as skewed; that is, having different velocities at the beginning and end of the path travelled. The type of skew is indicated as beginning skew, meaning that the device is programmed to move more rapidly at the beginning of travel than at the end.

The next point to be programmed is at 50° of press rotation as indicated by the thumbwheel arrangement 108, and the position as selected on the thumbwheels 111 is 48 inches. The type of motion is again skewed with a beginning skew as shown in the thumbwheel arrangement 113. A device position on/off switch for the thumb wheels in the "on" position allows the thumb wheels to be used for entering motion path input data. A data input receptacle 117 allows the use of a peripheral device such as a cassette or paper tape reader to be used for loading the motion paths for the axes without entering individual points through the thumb wheels.

In a function/operation section of the control panel, the lower portion thereof, there is included a device select switch 118 which selects the transfer device for which data is to be entered or displayed. A function select switch 119 cooperates with the device select switch to determine a particular axis for which data is to be entered or displayed. On the function select switch, the horizontal setting selects the horizontal axis of a device selected by the device select switch 118. This setting is operable in both the set up and data display modes of operation for entering or displaying motion data for the selected axis. The vertical setting for the switch 119 is similar to the horizontal position except it is concerned with the vertical axis of the loader or unloader. The lifter up setting calls for a "lifter up" condition for the press, which would be entered by setting the press position thumb wheels 108 when the switch 119 is in the lifter up position. Similarly, the jaw open and jaw close positions are set by the thumb wheels 108 for particular press angular positions for the device selected by the device select switch 118.

The home position for the switch 119 causes the horizontal or rotary function of the selected axis device to perform a seeking movement to its home position. The other home (vert) switch setting causes the vertical axis of the selected device to move to its home position. The data read setting of the switch 119 permits the loading of a motion path profile from a peripheral device such as a tape or cassette reader through the input receptacle 117. The data write position permits writing the contents of the motion path coordinates from the computer onto a peripheral device such as cassette or tape.

A clear data pushbutton 121 clears the current contents of input data and motion path profile information for the device selected by the switch 118. This pushbutton 121 is active when the mode switch 122 is in the set up mode. In the press test mode, the switch 122 permits operation of the individual press and its devices separate from the press line. In the device test mode, the device motion path may be executed for selected devices without operation of the press. The set up mode is used for jogging a selected device or entering motion path data for that device. The data display setting for the switch 122 operates in conjunction with the device select switch 118 to cause the current input data for the selected device function to be displayed by the press position display 109, motion/skew display 114 and device position display 112. The enter/display data pushbutton 123 is used to effect the entry of data for the execution of a selected axis function. When the switch 122 is in the data display mode, pushing the button 123 places the current data in the displays 109, 114 and 112.

A three-position retract/position switch 124 permits the selected device to be retracted to its home position or moved to the synchronized path position. The action is initiated by a pushbutton 126. A feedrate override switch 127 controls the rate of motion of the transfer devices along their synchronized paths when in the device test mode as selected by switch 122. The feed rate percentages vary from 0 to 100%, with 100% being the rated device speed. The pushbutton 128 activates power to all axes of the control devices. A load data pushbutton 129 initiates the set up computations of a motion path profile to be placed in a table for the selected device. An emergency stop switch 131 stops the press and all devices and removes power from all axes.

Typically, to enter the necessary axis position information through the control panel 43 for the computer 30, a few desired transfer mechanism positions are entered with corresponding press cycle positions. Each of the six axes of position information is separately entered. Thus, for example, it might be desired to have the jaws of the unloader mechanism inside the working area of the press at a press position of 270°, at a position for loading a workpiece onto the output conveyor at 10°, and dwelling in a retracted position from 50° to 270°. The x axis positions for the unloader device in combination with the corresponding press positions are then entered through the control panel 43. Additionally, the type of motion and skew, if any, for arriving at each device position is entered. After all of the x axis position information is entered, the data is loaded to form a motion table for the x axis of the unloader. Then a similar sequence is followed for entering the vertical axis position information, which is then also loaded into the computer 30. The points in the press cycle at which the jaws are to be opened and closed are also entered through the control panel 43. Similarly, the loader positions, conveyor positions, turnover device positions, and lifter up command signal are entered through the control panel for the appropriate press positions.

The operation of the computer 30 in coordination with the control panel 43 for loading and processing device position information shall now be described in conjunction with exemplary flow charts. With initial reference to FIG. 8, at the start of the procedure for loading data, either the thumbwheels may be used for manual entry of device position information as indicated in the left branch of FIG. 8, or the data may be directly read, such as from a cassette or paper tape as represented by the right branch. If data is to be coupled directly through the control panel to the computer such as from a cassette, the input is made through the receptacle 117 (FIG. 7) and the tabular data, to be described in more detail hereinafter, is directly read from the cassette. At such time the function select switch 119 is set to the data read setting.

For the manual entry of data, each function such as the horizontal or vertical axis of the unloader, as set by the switch 119, for each device as set by the switch 118, is set and the clear data button 121 pushed to clear all of the data from an input data table and a motion path table, forming a portion of the internal computer memory. The input data table contains the specific points with their corresponding press positions for the various axes of the various devices which are entered through the thumbwheels on the control panel 43. After these values are entered, the load data button 129 is depressed and the motion path table is derived from the input data table values for each axis. Subsequently, the positions of the devices with the corresponding press positions may be displayed, a device test sequence may be executed, and the press subsequently run, in conjunction with the controlled devices. The loaded data may also be punched onto a paper tape through a connection at the data input/output receptacle 117 with the function select switch in the data read position.

Figures 8, 9:
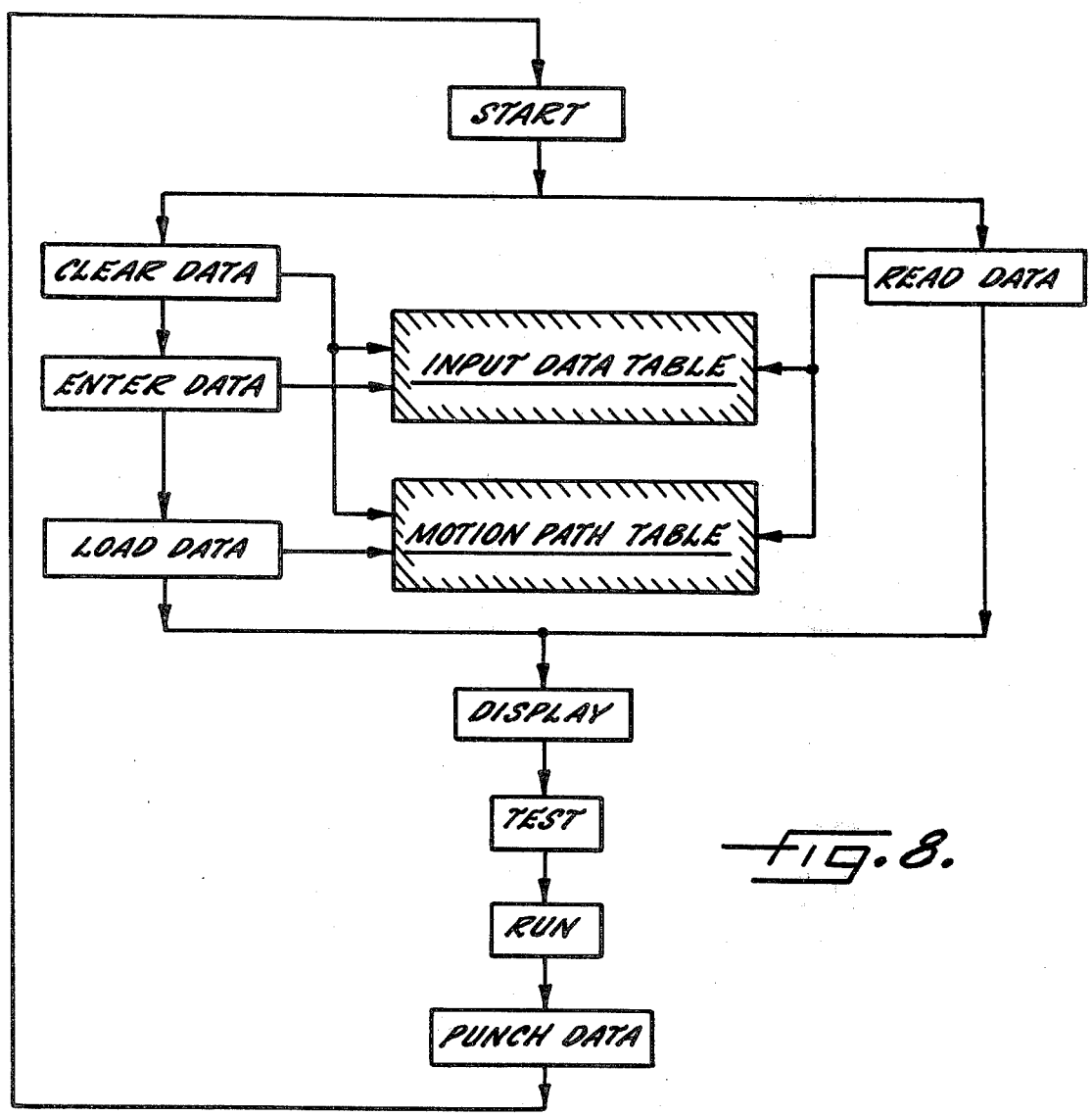
FIG. 8 is a simplified flow diagram of the operation of the computer of the control system.
FIG. 9 is an illustration of an input data table used by the computer.

The form of the input data table is shown in FIG. 9, such as for either of the horizontal or vertical axes of the loader or unloader. The tables for the conveyor and turnover device are similar, and simplified tables showing the press angle for activation of the jaws of the loader and unloader and of a lifter are provided.

The data to be entered in the input data table is an arrangement of position locations for an axis of a device identified by press angles. Typically, several desired locations for each one of the devices such as the unloader are selected. These might be, for the unloader, a position inside the press after a press operation, a position for depositing the work piece on the conveyor, and a dwell position away from the conveyor and press during a press operation. A horizontal and a vertical position relative to a rest or zero position would be provided for each of these desired points for the unloader. If the table of FIG. 9 were for the x axis of the unloader, the discrete desired x axis positions would each be identified by a line in the table. In that row of information, the angle is the press angle, the position is the x axis horizontal position for the unloader, the motion column entry is for the type of motion used to arrive at that position, and the skew column contains the type of skew, if any, of the motion in arriving at that position. In order to enter each line of information, the device select switch 118 and the function select switch 119 of the control panel 43 are placed at each of the different axis positions and the information for each point for that axis entered on the thumb wheels 108, 111 and 113. When the desired line of information for the selected device is on the thumb wheels, the enter/display data button 123 is depressed to enter the data into the input data table.

As indicated in the flow chart of FIG. 8, after all of the desired data has been entered into the input data table, the load data button 129 is depressed to actuate the computer to process the lines of data in the input data tables into a 500 line motion path table. In order to do this, the computer executes a load data subroutine associated with each of the axes.

Figure 10:
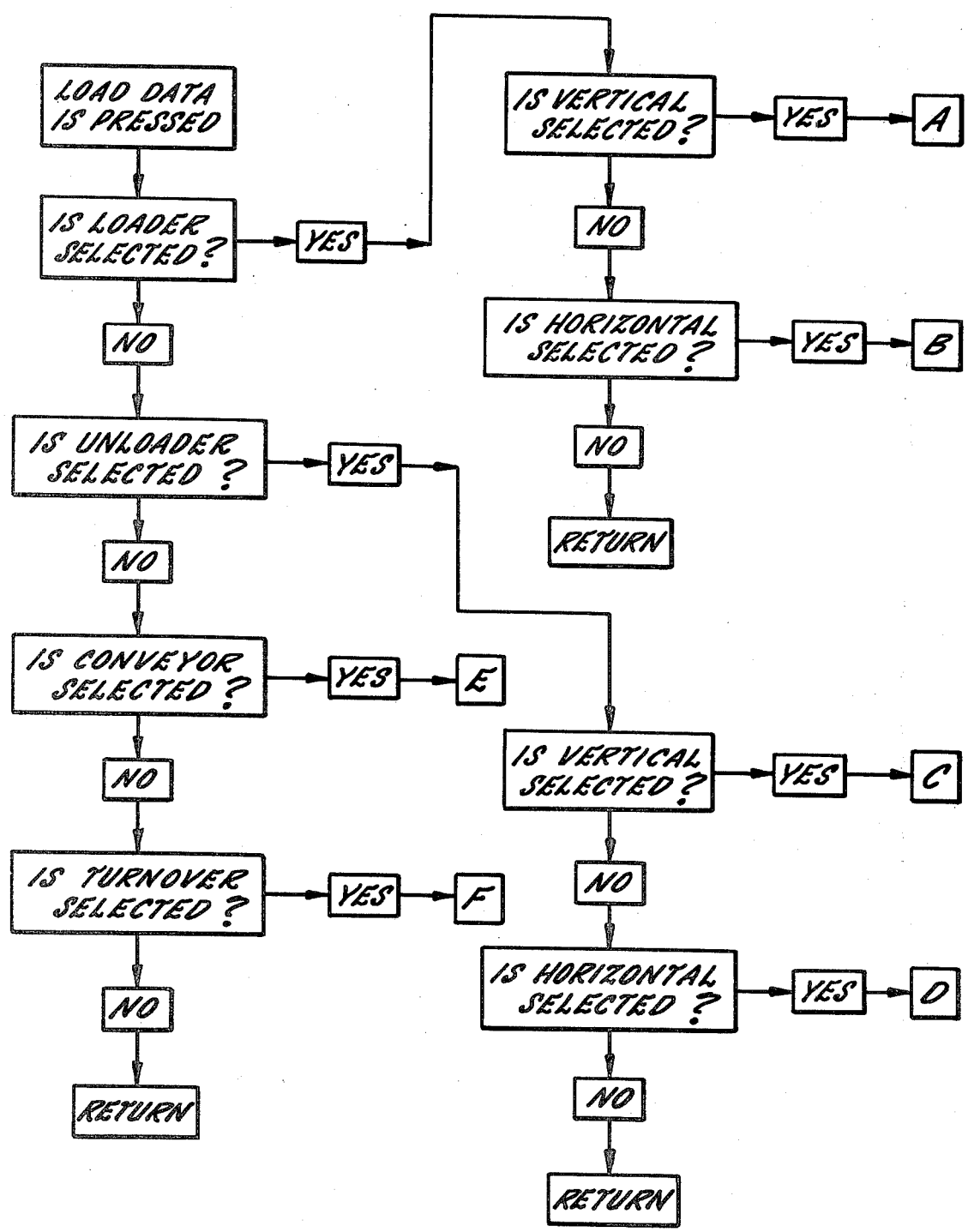
FIG. 10 is a simplified flow diagram of the basic routine for loading transfer mechanism position information into the computer memory.
Figure 13:
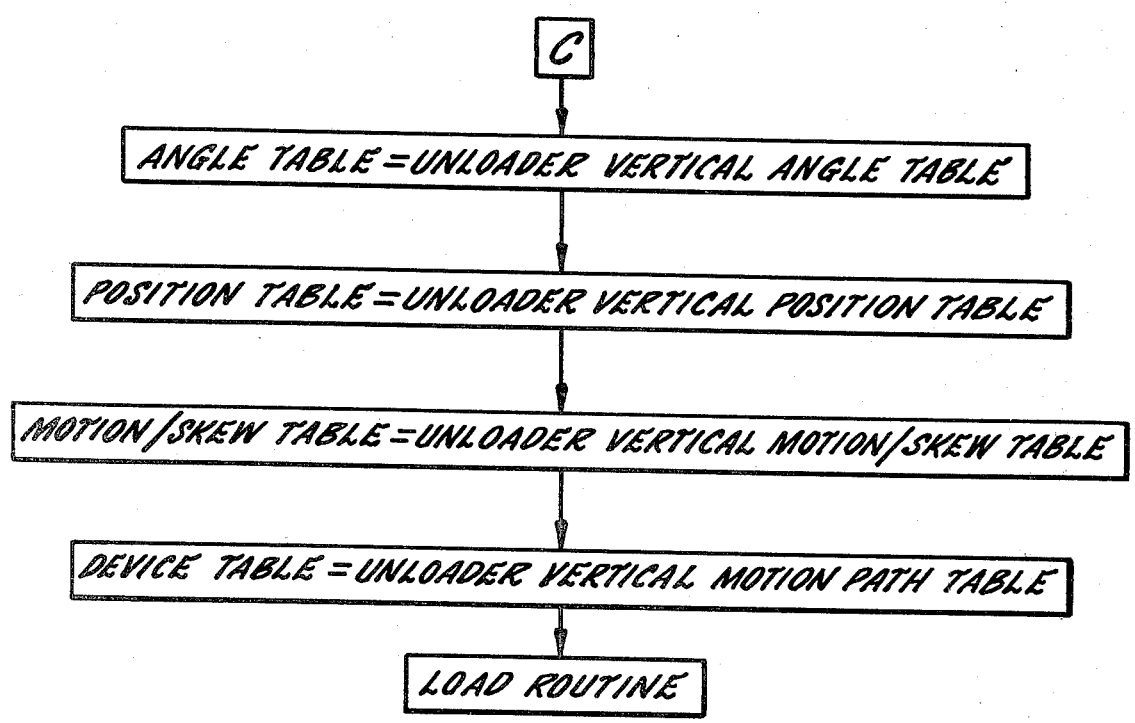
Figure 14:
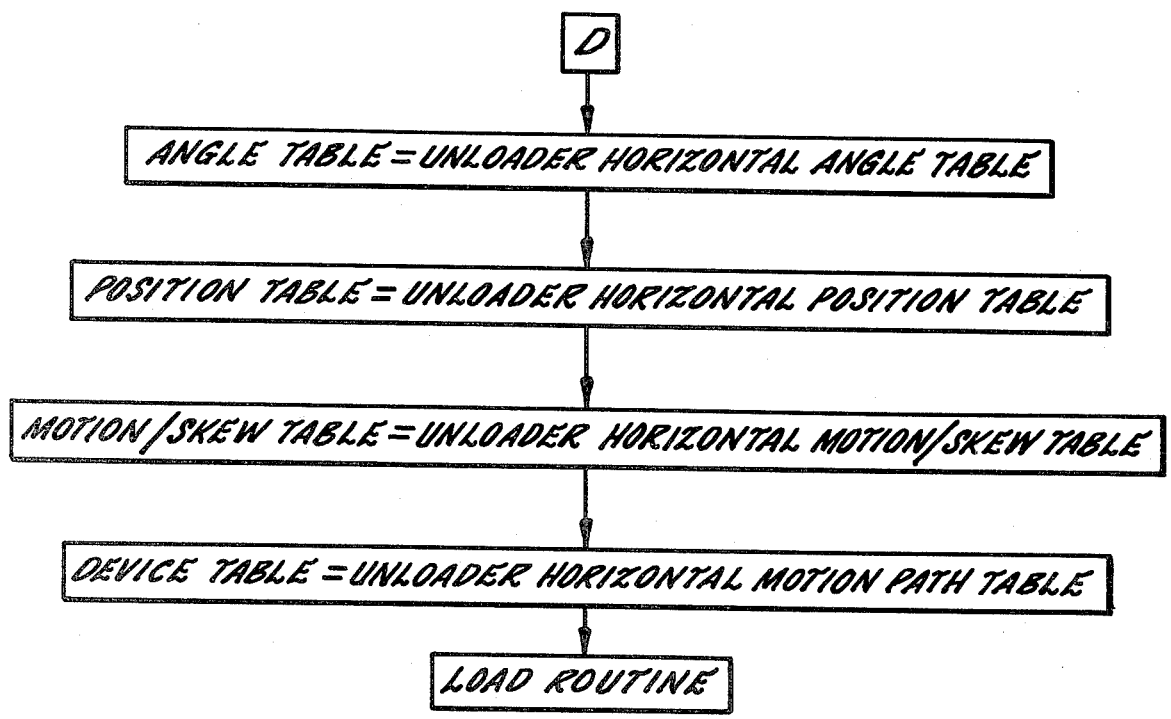
Figure 15:
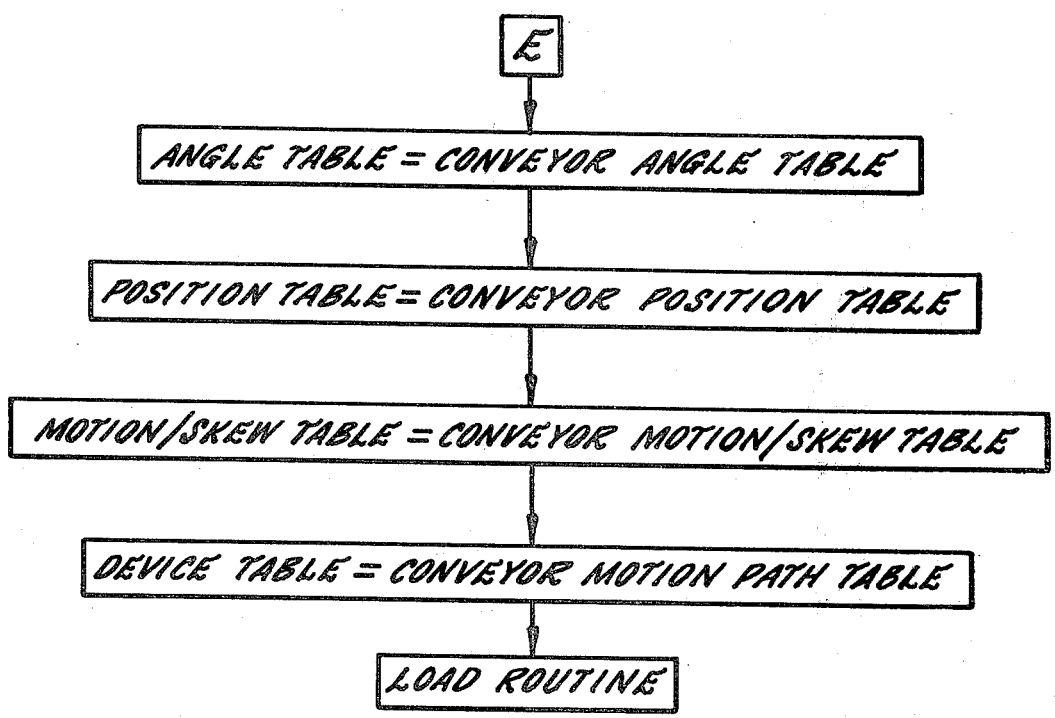

As shown in FIG. 10, when the load data button is depressed, the computer checks the settings of the device and function select switches to determine for which axis input data is to be processed into the motion path table. The computer then selects the appropriate tables and table sections from the various axes of input data tables and the appropriate potion of the motion path table. For example, if the horizontal axis of the unloader has been selected when the load data button is depressed, the steps followed by the computer are as shown in FIG. 13. The angle table column, position table column, motion and skew table columns from the unloader vertical axis input data table are placed in an operable position for use by the computer in executing a load routine. Similarly, the portion of the motion path table for the unloader vertical axis device is accessed for entering the calculated vertical motion values.

Figures 17, 19:
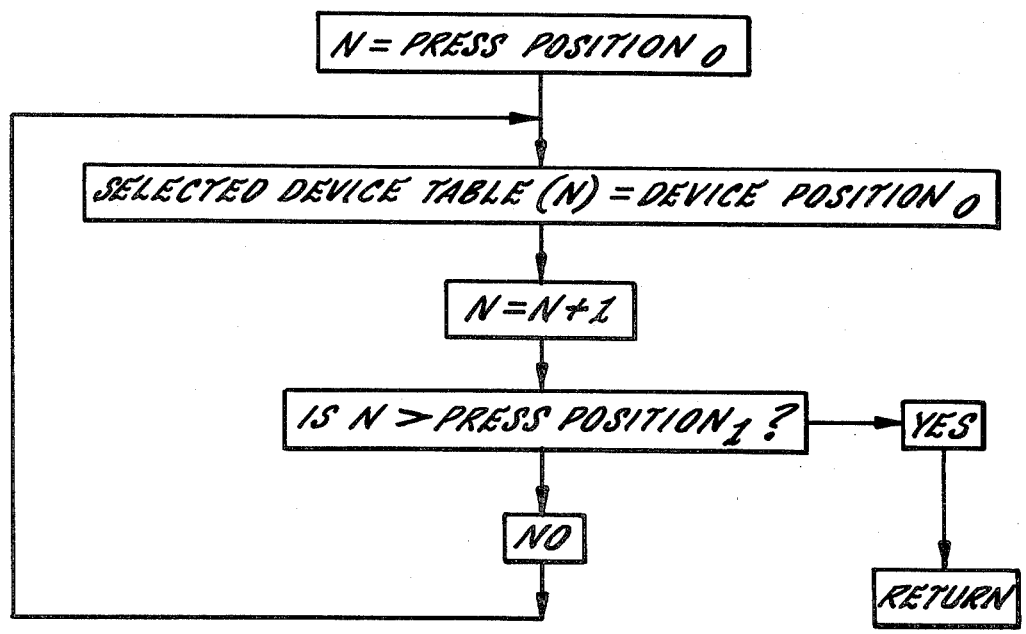
FIG. 17 is an illustration of a motion path table for use by the computer of the control system.
FIG. 19 is a flow diagram of the dwell subroutine used in association with the load routine of FIG. 18.

FIG. 17 illustrates the motion path table, wherein one press cycle is divided into 500 equally spaced press positions. A position value for each of the six axes is calculated through each of the load routines to provide a location for each device corresponding to each of the 500 press positions.

Figure 11:
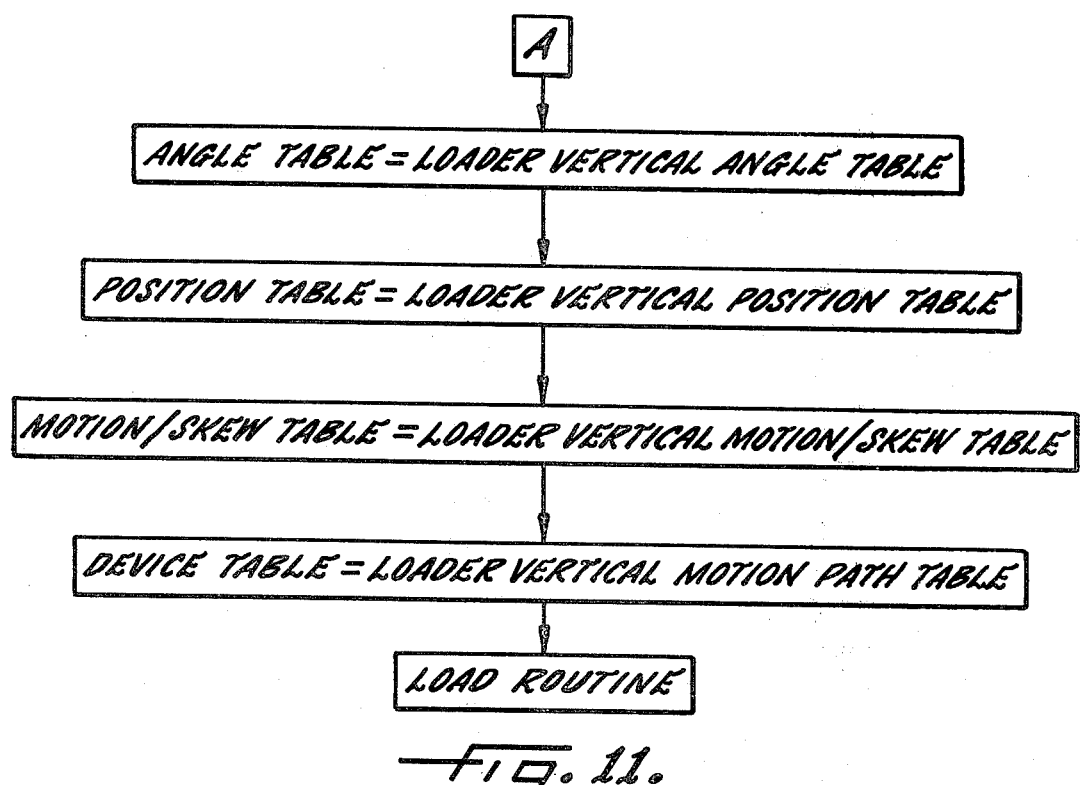
FIGS. 11 through 16 are flow diagrams of the computer operation for preparing for a load routine for position information relative to each of the six axes of transfer mechanisms.
Figure 12:
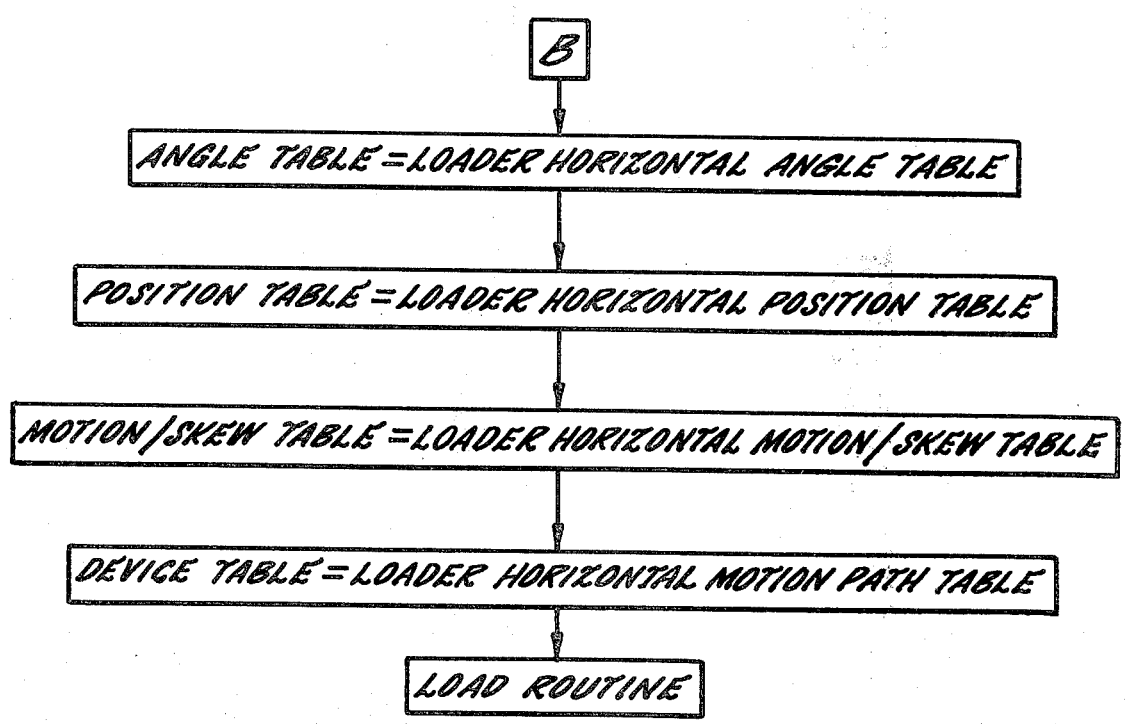
Figure 16:
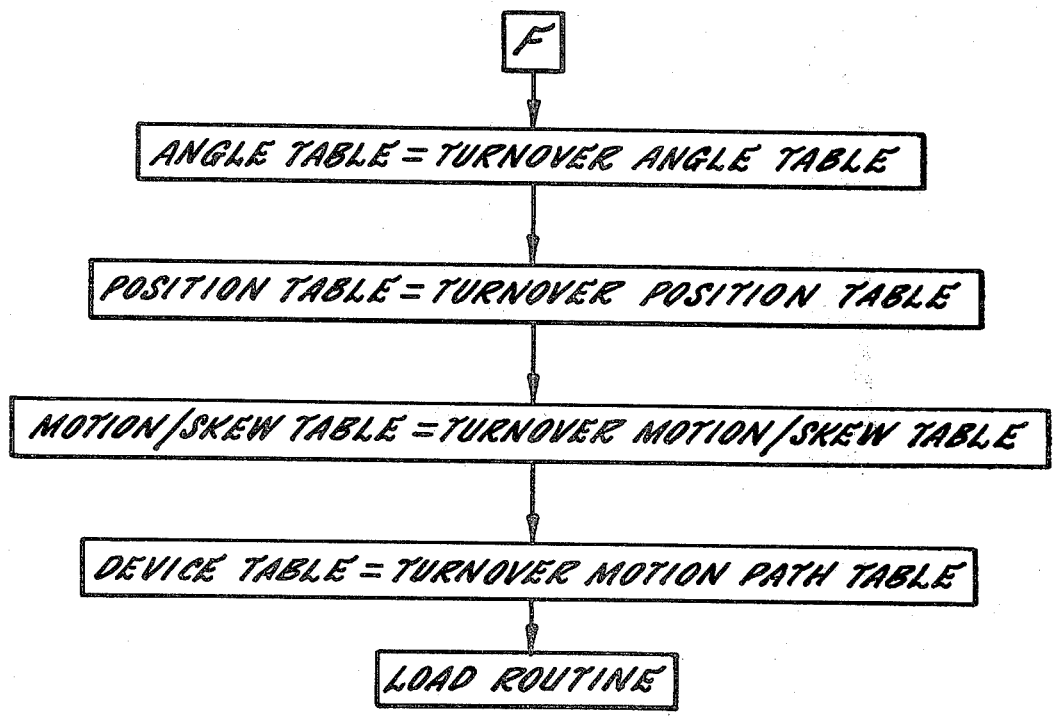
Figure 18:
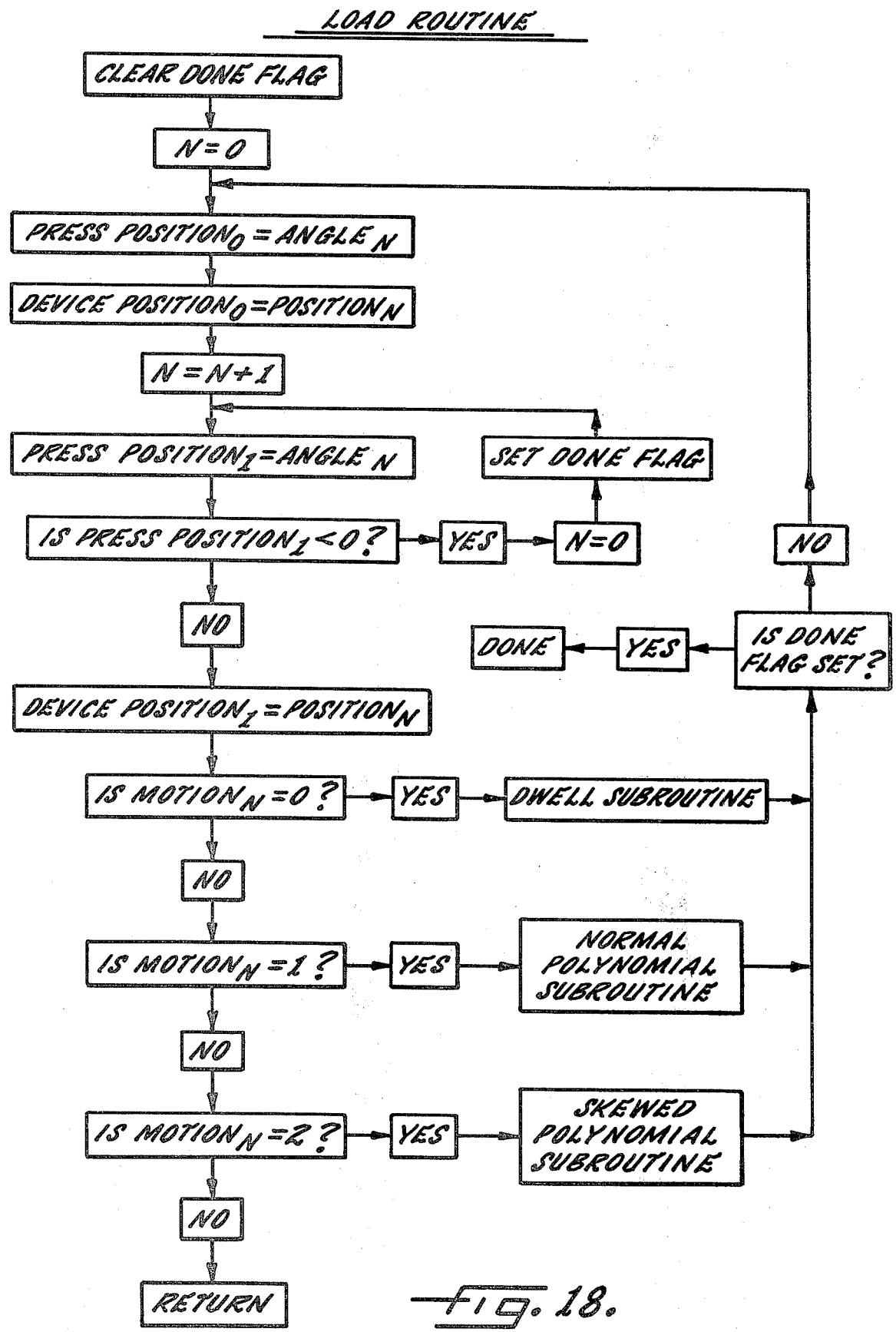
FIG. 18 is a flow diagram of the load routine for loading information into the motion path table.

The load routine for each axis is illustrated in FIG. 18. This load routine is entered from each of the subroutines of FIGS. 11 and 16. When entering the load routine, the computer first clears a done flag and begins by setting the first position identifier N equal to zero. Taking, for example, moving to the load routine of FIG. 18 from the unloader vertical axis routine of FIG. 13, the computer first selects the first, or 0, press position angle from the unloader vertical angle table. The computer then also reads the corresponding device position for this angle.

Since the motion and skew associated with the first press angle and device axis position are concerned with the motion and skew for arriving at that position, the computer then increments to the next, N plus 1, line on the vertical unloader table. The computer then reads the second press position angle from the unloader vertical position table. It will be recalled from FIG. 8, that when data is cleared, the input data table and the motion path table are cleared. When the input data table is cleared, all of the values in the different locations are set to negative numbers. Therefore, in the next step in FIG. 18, the computer determines if the next press position angle is less than 0. If it is, then N is set equal to 0 and the done flag is set. In the present example, for the moment, we will presume that the press position is not a negative number. Then the computer reads out a new device position corresponding to the just-read press position.

At this point, the latest-read press and device positions are designated positions 1. The previously read press and device positions are read as positions 0. The motion and skew information to be utilized is that motion and skew associated with the press and device positions 1. The computer then determines which type of motion has been called for, dwell, normal, or skewed. If none of these types of motion are called for, the computer exits from the routine because there has been an error. If one of the three types of motion has been read from the motion/skew table, the appropriate subroutine, to be described hereinafter, is executed. In these subroutines, the actual unloader vertical values for the motion table are calculated.

After a particular subroutine is executed, the computer determines if the done flag has been set. If it has, the load routine is finished and the computer exits from the routine. If the done flag is not set the computer returns to the beginning of the routine to read the next press and device positions.

Figure 20:
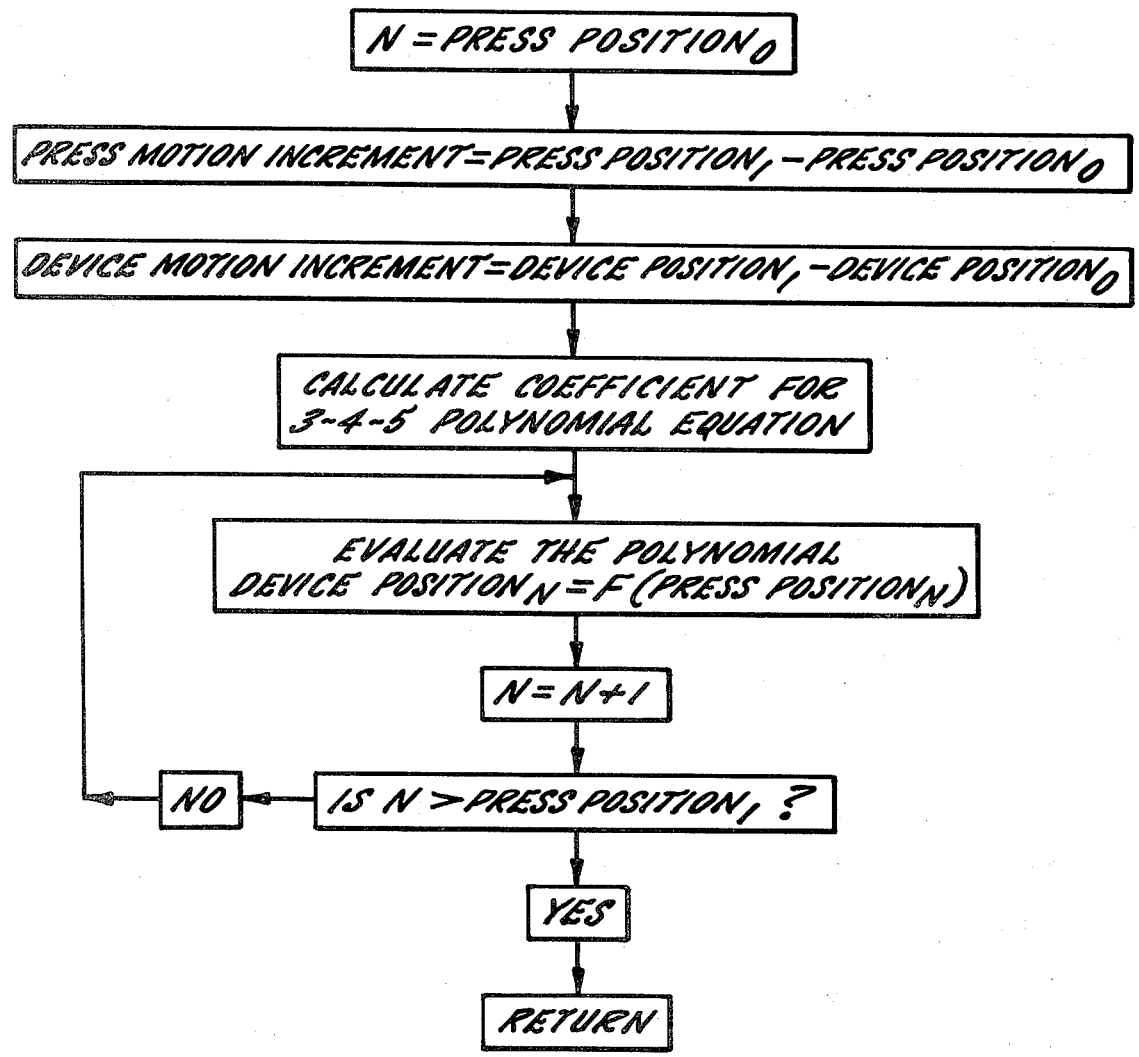
FIG. 20 is a flow diagram similar to that of FIG. 19 for normal motion for a segment of the motion path table.
Figure 21:
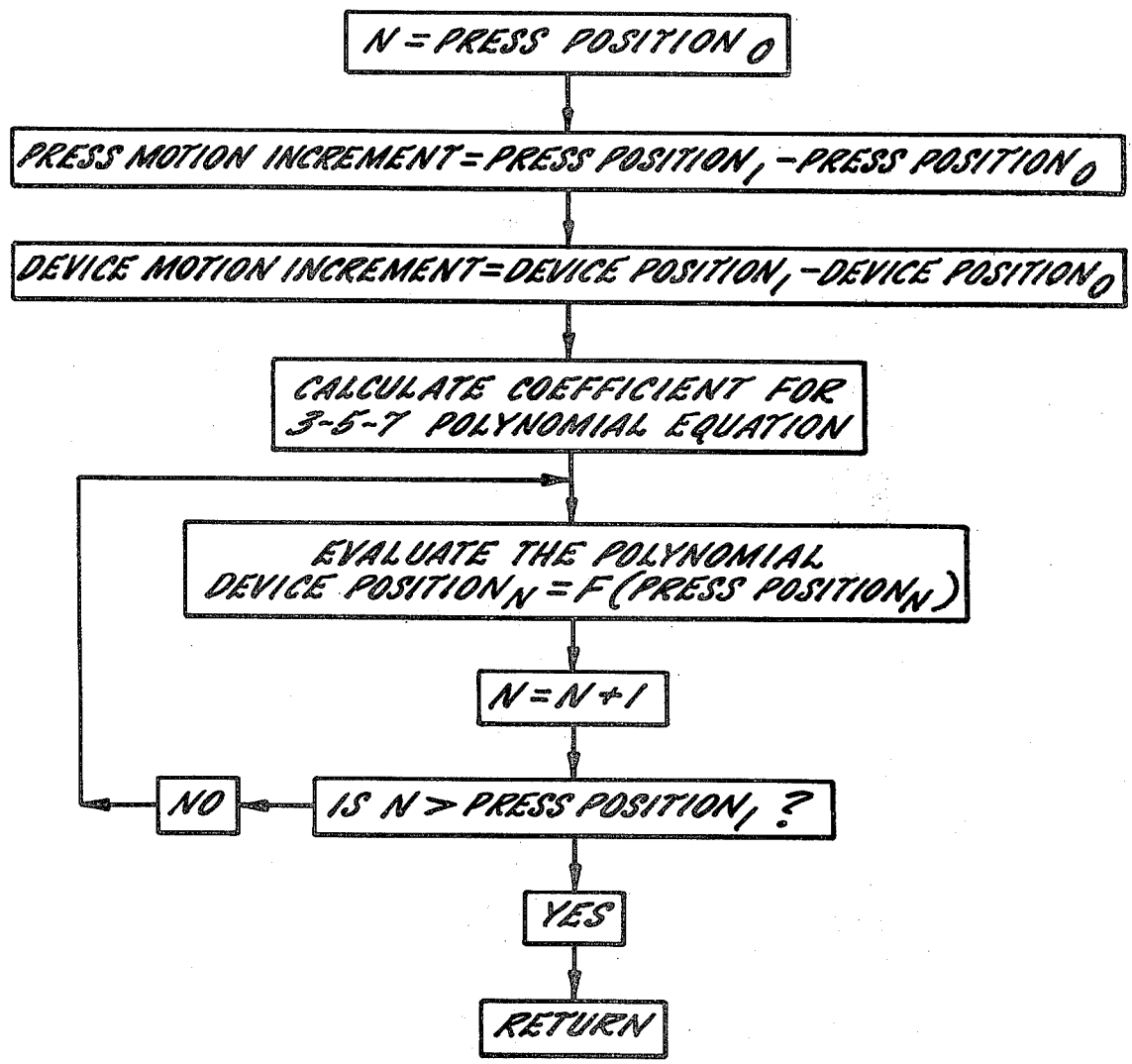
FIG. 21 is a flow diagram similar to that of FIG. 20 for skewed motion.

In order to set the done flag, the incremented, N plus 1, press position must be read as being a negative number; that is, meaning that there is no further position information to be obtained from the table. If this is the case, N is reset to 0 and the done flag is set. As can be seen from the flow chart, the computer returns to the first press and device positions, positions 0, which remain the same as originally, and the press, device, and motion/skew values are now those of the initial entry in the input data table. This is necessary since the end point of the cycle of positions for a device axis is the same as the beginning point. FIGS. 19, 20 and 21 show the dwell, normal, and skewed motion subroutines, respectively.

In executing the dwell subroutine, illustrated in FIG. 19, the computer determines a press position line of the motion path table, 0 through 499, corresponding to the first press position, press position 0 from the load routine. This is a matter of converting from the notation of 360° for one press drive rotation to 500 equal segments per rotation as used in the motion path table of FIG. 17. Next, the computer places the initial device position, device position 0 from the load routine, in the motion path table on the line of the table corresponding to press position 0 as translated to five-hundredths of a press cycle from the previous step.

The computer then increments to the next line in the motion path table and checks to see if this position is beyond the end position for the dwell segment. The press position 1, the second press position from the load routine FIG. 18, as converted from degrees to the appropriate motion path table line, is the end of the dwell segment. If the line reached in the table is beyond the end of the dwell segment, the computer returns to the load routine. If the line reached in the motion path table is not beyond the end of the dwell segment, the computer returns to write the same device position in this next line on the motion path table.

In FIG. 20, the normal motion subroutine is illustrated. In this case, the beginning press position in the motion path table is selected as before. The computer then determines a press motion increment, which is the difference between the start and end positions, position 1 minus position 0 from FIG. 18. Similarly, a device motion increment is determined by subtracting the end point positions, device position 1 minus device position 0. Based upon the press angle increment and the device position change increment, the computer calculates the coefficients for a three-four-five polynomial equation to plot the motion of the particular device axis over the interval.

While various motions are possible in moving over the interval, the polynomial equation selected is based upon cam design principles, with the form being as follows:

$$y = a - bx^3 + cx^4 - dx^5$$

Such cam design equations may be found discussed in various text such as *Cams* by Harold A. Rothbart, John Wiley and Sons, 1956.

After the coefficients for a polynomial equation are calculated based upon the entire interval, the polynomial is evaluated for the first press position, and the calculated device position is placed in the appropriate column of the motion path table on the line for the corresponding press position. The press position is then incremented by one. If this press position is greater than the press position at the end of the motion segment, press position 1 from FIG. 18, then the computer returns to the load routine. Otherwise, the polynomial is evaluated for the next press position and the device position inserted in the table.

The skewed polynomial subroutine of FIG. 21 shall not be described in detail since it is substantially the same as the normal polynomial subroutine of FIG. 20 except that the polynomial equation differs from the motion equation of the normal subroutine. For the skewed motion, a beginning skew or an ending skew is determined based upon the information from the input data table for the motion interval. The skewed equation results in either faster motion at the beginning of the interval or faster motion at the end of the interval for the particular device axis involved.

Once the load routine of FIG. 18 has been executed, including all of its various subroutines, for each of the six axes, the motion path table of FIG. 17 is completed. In addition, in another memory location, the jaw open and close commands and the lifter commands are stored with an associated press position. When the press and control are tested, the computer steps through the press positions, 0 through 499, and acts through the previously described servo loops to maintain each of the six device axes at the tabular position.

In the illustrated system, the commands to the servo amplifiers are adapted as follows. The press is presumed to operate at a basic rate of 16 strokes per minute. The basic clock rate for the computer is set to have an interval between clock pulses of 1.5 milliseconds. The press position sensor provides 10,000 counts per press cycle. As illustrated above, the motion path table contains 500 blocks, or lines, of position information for each press cycle.

The above parameters result in there being 20 press feedback counts per line of the motion path table. This also means that there are four press feedback counts per clock cycle of the computer. Thus there are five clock cycles per block or line of the motion path table.

At each computer clock pulse, the counts from the press position feedback are checked by the computer. With the press operating at the basic 16 strokes per minute rate, there will be the basic four counts per clock cycle. Five of these clock cycles will occur each block, or line of the motion path table. An interpolation routine is performed to obtain desired axis locations at each of these clock cycles, the interpolation occurring between the lines of the motion path table. Through the interpolation, the computer is able to issue servo commands for each axis 5 times per block of data in the motion path table. An acceptable system of interpolation, as well as general techniques of device axis numerical control, is illustrated in U.S. Pat. Nos. 3,941,987 and 3,941,988, commonly assigned with the present application.

It should be noted that using the illustrated system, in addition to the typical numerical control operations, the clock rate for the computer is adjusted, within a certain range, dependent upon the number of press feed-back counts received between clock pulses. In other words, the basic clock rate corresponding to 1.5 milliseconds between pulses will be speeded up if the press is operating faster than 16 strokes per minute, and the clock will be slowed if the press is slower than the basic strokes per minute. Thus, the system attempts to maintain the four press feed-back counts per clock cycle synchronization. If the press slows or speeds up beyond a pre-set limit, the number of counts from the press feed-back line per clock cycle are shifted, such as to either 2 to 5 counts per clock cycle. Further variation of the press speed operates to terminate operation of the press and-/or the control axis devices.

In the exemplary system, the transfer mechanism axes associated with a particular press are controlled in accordance with the angular position of the press drive. In a synchronized press line system, with the press drives synchronized with one another, this results in total synchronization of the entire press line system with associated transfer mechanisms. The exact distribution of discrete computers for executing the control functions for transfer mechanism is not critical, and the computing power for controlling the transfer mechanisms of two presses, for example, could be incorporated in a single control computer arrangement.

To ensure that the press and the various workpiece transfer and handling mechanisms do not interfere with each other during the high speed operation that is required for maximum productivity, it is necessary to control not only the successive portions to which the press and the other mechanisms are moved, but also the velocities and paths followed during such successive movements. The clearances between the various moving parts are at times very small as they move rapidly from point to point, and thus the room for error is also very small. To closely control these movements, the positions of the various moving parts are monitored at successive time increments $\Delta T$. These time increments $\Delta T$ correspond to the time periods $\Delta T$ which are measured off in actual time in the interpolation system described in the aforementioned U.S. Pat. Nos. 3,941,987 and 3,941,988. Although reference may be had to those patents for a detailed understanding of such interpolation system, the application of that system to the present power press control arrangement will be briefly described here.

The only command data supplied to the interpolation system as applied to the present invention is data representing desired positions for the various mechanisms to be moved along the respective axes of controlled movement, at selected intervals of each press cycle. For example, in the exemplary embodiment described above, the command data is the data of FIG. 17, wherein each press cycle is divided into 500 equal parts. Velocities are not included in the command data because the press drive operates at a constant velocity, and thus the time intervals $T_p$ between the 500 equally spaced press positions are all equal. Consequently, the desired velocity for the movement of any controlled mechanism between any pair of commanded positions $P_n$ and $P_{n+1}$ can be computed by dividing the distance $D_{n+1} = P_{n+1} - P_n$ by the constant time interval $T_p$.

Figure 22:
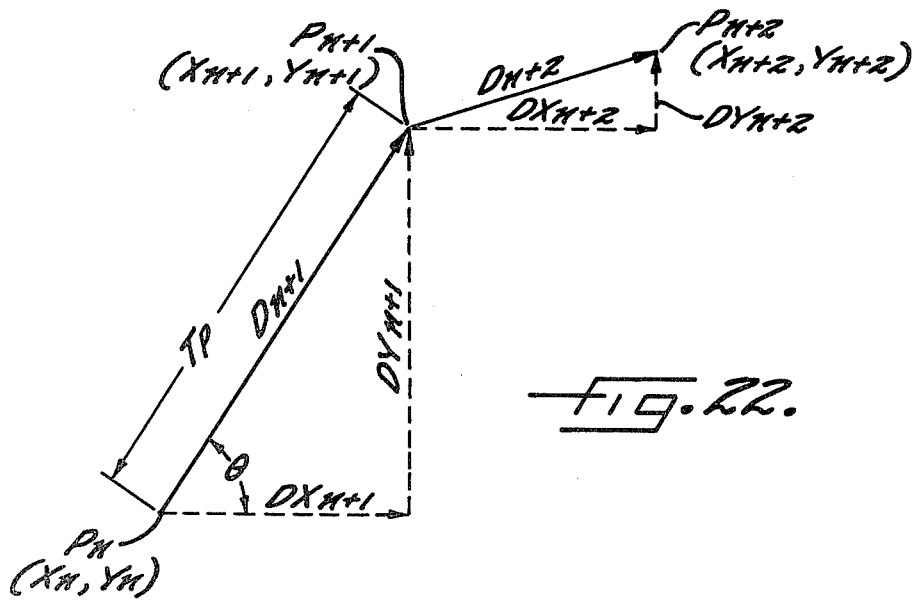
FIG. 22 is a vector diagram showing two successive path segments, and their X and Y axis components, of the path to be followed by one of the controlled mechanisms in the press system of FIGS. 1-7.
Figure 23:
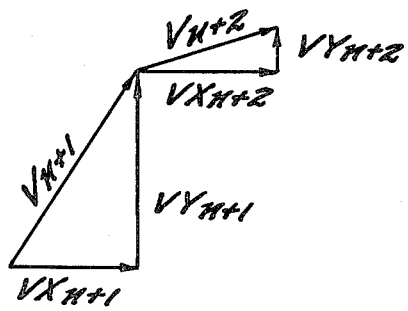
FIG. 23 is a diagram showing the corresponding velocity vectors for the two path segments shown in FIG. 22.

This can be understood more clearly by reference to FIGS. 22 and 23, in which the path segment for a command data block $B_{n+1}$ is a distance vector $D_{n+1}$ lying at some desired angle $\theta$ in an X, Y plane. More specifically, the data block $B_{n+1}$ designates the coordinates $X_{n+1}$, $Y_{n+1}$ of the position $P_{n+1}$ to which the controlled member is to move from the previous position $P_n$, identified by coordinates $X_n$, $Y_n$ in the previous data block $B_n$. These two sets of coordinates numerically designate the length of the X and Y axis components $DX_{n+1}$ and $DY_{n+1}$ whose vector sum is the path segment $D_{n+1}$ lying at an angle $\theta$ which is $\tan^{+1} DY/DX$. As an alternative to designating the ending coordinates $X_{n+1}$, $Y_{n+1}$ the command data may directly represent the values of the axis components $DX_{n+1}$ and $DY_{n+1}$.

As mentioned previously, the desired velocity for $V_{n+1}$ movement of the controlled member along the path segment $D_{n+1}$ can be defined as $$V_{n+1} = \frac{D_{n+1}}{T_p}$$

The vector components of this velocity $V_{n+1}$ are $$VX_{n+1} = \frac{DX_{n+1}}{T_p} \quad VY_{n+1} = \frac{DY_{n+1}}{T_p}$$

To prevent the controlled mechanism from deviating from the precise path segment $D_{n+1}$ it is important that the mechanism be driven at the exact velocities $VX_{n+1}$ and $VY_{n+1}$ along the respective X and Y axes. If these component velocities are not adhered to, the mechanism will stray from the desired path and possibly interfere with the movement of one or more of the other controlled mechanisms.

With this objective in mind, the system computes theoretical desired positions for the controlled mechanism at repetitive time increments $\Delta T$ within the interval $T_p$, and these positions are then compared with the instantaneous actual positions of the mechanism in each of the successive time increments $\Delta T$. Discrepancies between the desired and actual positions are detected and used to generate error signals, which in turn are used to correct the discrepancies. These operations are repeated during each of the successive time increments $\Delta T$ so that any errors are quickly corrected at their inception, before they build up to a significant level.

The time increments $\Delta T$ are measured off in actual time, and are short enough that a number of $\Delta T$'s occur within each interval $T_p$. For example, when $T_p$ is 0.01 second, a typical $\Delta T$ is 0.002 seconds, which can be measured by presetting a down counter with a number CLBFR equal to 200 and feeding the counter with pulses at a rate of 100 KHz. The counter will then reach and hold zero in 200/100,000 = 0.002 seconds. One advantage of this arrangement is that the duration of $\Delta T$ can be easily adjusted by merely changing the number to which the counter is preset.

To compute the desired positions of a controlled mechanism at time increments $\Delta T$, the starting coordinates of the path segment are progressively increased by increments equal to the respective axis velocities multiplied by $\Delta T$. These increments will be designated herein as PRXC and PRYC for the X and Y axes, respectively, and can be defined as $$PRXC = (VX)(\Delta T)$$

$$PRYC = (VY)(\Delta T)$$

The desired coordinates applicable during a current $\Delta T$ are determined during the previous $\Delta T$ and will be designated XTC and YTC, and the desired positions applicable during the next $\Delta T$ are determined during the current $\Delta T$ and designated XT and YT. Thus:

$$XT = XTC + PRXC$$

$$YT = YTC + PRYC$$

To determine whether the controlled mechanism is at the desired position in each successive increment $\Delta T$, the current desired position represented by the coordinates XTC and YTC for each $\Delta T$ is compared with the actual position of the mechanism in that $\Delta T$. The actual position is sensed by a pair of counters which count pulses from a pair of pulse generators XPG and YPG driven by the output shafts of the servo motors for the X and Y axes of movement of the particular mechanism being controlled. These pulse generators typically produce one pulse for each 0.001 inch of movement by the mechanism along the respective X and Y axes. Thus, the numbers stored in the counters at any given instant numerically represent the actual position of the mechanism along the X and Y axes at that instant. These electrically signaled numbers are designated X1N and Y1N, respectively.

The current desired position signals XTC, YTC and the current actual position signals X1N, Y1N are both fed to the computer where the latter are subtracted from the former to detect any error that might exist, i.e.:

$$XERR = XTC - X1N$$

$$YERR = YTC - Y1N$$

XERR and YERR are the instantaneous position errors computed during each time increment $\Delta T$ for the X and Y axes of movement by the controlled mechanism.

Each position error signal XERR or YERR (multiplied by a constant "trim" or gain factor, if desired) is algebraically summed with the signal PRXC and PRYC to yield a velocity command number XDAC or YDAC, i.e.:

$$XDAC = XERR + PRXC$$

$$YDAC = YERR + PRYC$$

The analog counterparts of these numbers XDAC and YDAC are d-c. voltage $E_x$ and $E_y$ that control the velocities of the X-axis and Y-axis servomotors. That is, the magnitude of the voltage $E_x$ is directly proportional to the number XDAC, and the magnitude of the voltage $E_y$ is directly proportional to the number YDAC.

As XERR or YERR increases either positively or negatively, the number XDAC or YDAC is increased or decreased accordingly. This in turn increases or decreases the magnitude of the d-c. voltage $E_x$ or $E_y$, which increases or decreases the velocity of the controlled mechanism along the corresponding X or Y axis to reduce the position error.

If the error XERR is fully reduced to zero, however, the term XERR ceases to contribute to the value of the number XDAC. In order to provide a permanent adjustment to maintain zero position error, the term XBIAS is added to XERR and PRXC, viz.:

$$XDAC = XERR + PRXC + XBIAS$$

If an error does arise and the term XERR results in an increase of XDAC to raise the X velocity higher than that repesented by the PRXC term alone, the number XERR will be gradually returned to zero. As XERR is reduced, however, the number XBIAS incrementally increases in magnitude with successive $\Delta T$'s as long as XERR has a finite value. Consequently, when the term XERR is reduced all the way to zero the summation of PRXC and XBIAS yields a value of XDAC which drives the controlled mechanism at an X-axis velocity which results in substantially zero error. In this way, as long-term errors arise, they are removed to restore the existing position errors to zero even though a velocity signal XDAC greater than PRXC is required to produce the actual velocities which result in zero following errors.

The Y-axis is conrolled in the same way:

$$YDAC = YERR + PRYC + YBIAS$$

To ensure that the servo drives for all the controlled axes can keep up with the velocities called for by the control system, while at the same time maintaining the requisite synchronization among all the controlled axes, the length of $\Delta T$ is increased slightly each time a lagging error above the threshold level is detected for any one of the axes. These incremental increases in $\Delta T$ continue, up to a predetermined maximum, as long as the lagging error persists. By increasing $\Delta T$, more time is allowed for the servo motors to attain the next desired position defined by the coordinates XT, YT. The coordinates themselves do not change, nor do the incremental distances PRXC, PRYC, but more time is allowed for a mechanism to traverse the distance PRXY or PRYC between successive pairs of coordinates. The servos still receive almost the same input voltages $E_x$, $E_y$ and so drive the controlled mechanism at almost the same velocity, but the longer $\Delta T$ allows more time to catch up to the more slowly advancing desired positions XT, YT.

Although a lagging error on any axis will ultimately result in a slowdown of the actual velocity along that axis, due to the lengthening $\Delta T$, the velocities along all the other controlled axes will be correspondingly reduced because the same $\Delta T$ is used for all axes. Consequently, the controlled movements along all the axes remain synchronized as the controlled members continue along their respective commanded paths, but at velocities which are all reduced proportionally.

In order to increase $\Delta T$ slightly each time a lagging error above the threshold level is detected, a clock modifier number CLMOD is called from storage and incremented by a constant CLINC. The new sum is then stored in the CLMOD register and eventually used as a new number CLBFR to preset the down counter that measures off the $\Delta T$'s. As long as a lagging error persists, the number CLMOD (which initially starts at zero) is increased by one during each successive cycle. For example, over a period of 200 successive $\Delta T$'s, the number CLMOD can progressively increase from zero to 200.

Each time CLMOD is incremented, the system determines whether or not CLMOD has reached a predetermined maximum limit value CLMAX. This limit value is stored as a constant number CLMAX, and each time CLMOD is incremented the new value for CLMOD is subtracted from CLMAX. If the resulting answer is negative, it is known that CLMOD has reached its upper limit CLMAX, and CLMOD cannot be increased any further.

Whenever CLMOD is incremented, the original number CLBFR is called from its register and added to the then-existing value of CLMOD. This new value of CLBFR is the number to which the $\Delta T$-measuring down counter is preset at the beginning of the next cycle, thereby increasing $\Delta T$ for the next cycle. If the lagging error continues, progressive increases in the number CLBFR result in progressive lengthening of $\Delta T$, e.g., from a normal duration of 2 milliseconds up to as much as 40 milliseconds. Therefore, the rate of advance of the theoretical position number XTC or YTC is reduced, and when the instantaneous error numbers XERR and YERR are computed, it will be found that the position errors have been decreased. In effect, more time is available for the X and Y axis motions of the controlled member to keep up with the theoretically desired advancing position.

After a lagging error has been completely eliminated, each subsequent iteration of the servo routine will decrement the number CLMOD by one in each $\Delta T$ until the number CLMOD is restored to its normal value of 0. After a series of such cycles in which this decrementing occurs, all the axis velocities will have been increased back to their desired values. More specifically, in every iteration cycle the system reads in CLMOD, reads in and subtracts the increment number CLINC, and stores the result as a new value for CLMOD. This subtraction is repeated for each cycle as long as the number CLMOD is found to be greater than 0 (indicating that the time increments ΔT have been increased above their normal duration) and as long as no lagging error is found on any of the controlled axes. These repetitive subtractions eventually return the number CLMOD to its normal value of 0, at which the time the number CLBFR and the duration of ΔT are both stabilized at their original values and held constant until another position error is detected.

Although the invention has been described with particular reference to a system which uses a signal from a press drive position sensor as a timing signal for controlling movement of the controlled mechanisms between successive positions stored in the memory tables, other types of timing signals may be used to represent successive increments of a press cycle. For example, in a computer-controlled press the clock signal in the computer, which typically subdivides each press cycle into a multiplicity of small increments, can be used to select the desired locations for each of the controlled mechanisms at successive increments of the press cycle. Since this clock signal is used to control the press itself, and thus is precisely synchronized with the actual movement of the press drive, it can be used to derive the theoretical motion parameters for each of the controlled mechanisms from the data stored in the memory tables, in the same manner as a signal from a press drive position sensor which monitors the actual position of the press drive. Similarly, any signal which represents press position, either directly or indirectly, in a press synchronization system can be used in the same way.

The invention is also applicable to transfer feed presses, although it has been described above in the context of a line of single-station presses. That is, the workpiece handling equipment that is built into a transfer feed press can be controlled in the same manner as the loaders, unloaders, etc. described above for single-station presses.

What is claimed is:

1. A power press arrangement comprising:
   (a) a power press having a press drive for cycling a slide in and out of a working area;
   (b) an element having controlled motion in a mechanism for moving a workpiece relative to the working area of the press;
   (c) means for producing a timing signal representing successive increments of each press cycle;
   (d) means for monitoring the motion of the element (b);
   (e) a memory for storing data correlating desired positions for the element (b) with successive increments of a press cycle;
   (f) means for deriving theoretical motion parameters for the element (b) from said timing signal and the data of the memory (e);
   (g) means for comparing the theoretical motion derived by the means (f) with the motion monitored by the means (d); and
   means for controlling the motion of the element (b) based upon the results of the comparisons by the means (g).

2. The power press arrangement of claim 1 wherein said timing signal is a signal representing the actual position of the press drive.

3. The power press arrangement of claim 1 wherein said timing signal is a clock signal synchronized with the press cycle and subdividing each press cycle into a multiplicity of small increments.

4. The power press arrangement of claim 2 which further comprises:
   (i) means for entering discrete position data for the element (b) correlated with discrete press drive positions, the number of discrete positions being less than those stored in the memory (e); and
   (j) means for deriving intermediate positions of the element (b), between said discrete positions entered by the means (i), for storage in said memory (e).

5. A power press arrangement comprising:
   (a) a power press having a press drive, a slide and a working area;
   (b) an element having controlled motion in a loader mechanism for carrying a workpiece into the working area of the press;
   (c) means for monitoring the position of the press drive and its associated slide;
   (d) means for monitoring the motion of the element (b);
   (e) a memory for storing data correlating desired positions for the element (b) with positions of the press drive and its associated slide;
   (f) means for deriving theoretical motion parameters for the element (b) from press position information monitored by the means (c) and the data of the memory (e);
   (g) means for comparing the theoretical motion derived by the means (f) with the motion monitored by the means (d); and
   (h) means for controlling the motion of the element (b) based upon the results of the comparisons by the means (g).

6. The power press arrangement of claim 5 in which the element (b) is a pair of gripping jaws.

7. The power press arrangement of claim 6 in which the element (b) is mounted for vertical movement on a carrier which is in turn mounted for horizontal movement on a support element attached to a stationary portion of the power press.

8. The power press arrangement of claim 7 in which the horizontal and vertical motion of the element (b) are separately monitored by the means (d), separately stored by the memory (e), separately derived by the means (f), separately compared by the means (g), and separately controlled by the means (h).

9. A power press arrangement comprising:
   (a) a power press having a press drive, a slide and a working area;
   (b) an element having controlled motion in an unloader mechanism for moving a workpiece out of the working area of the press;
   (c) means for monitoring the position of the press drive and its associated slide;
   (d) means for monitoring the motion of the element (b);
   (e) a memory for storing data correlating desired positions for the element (b) with positions of the press drive and its associated slide;
   (f) means for deriving theoretical motion parameters for the element (b) from press position information monitored by the means (c) and the data of the memory (e);
   (g) means for comparing the theoretical motion derived by the means (f) with the motion monitored by the means (d); and (h) means for controlling the motion of the element (b) based upon the results of the comparisons by the means (g).

10. The power press arrangement of claim 9 in which the element (b) is a pair of gripping jaws.

11. The power press arrangement of claim 10 in which the element (b) is mounted for vertical movement on a carrier which is in turn mounted for horizontal movement on a support element attached to a stationary portion of the power press.

12. The power press arrangement of claim 11 in which the horizontal and vertical motion of the element (b) are separately monitored by the means (d), separately stored by the memory (e), separately derived by the means (f), separately compared by the means (g), and separately controlled by the means (h).

13. In a press line for performing a series of press operations on a workpiece including a series of power presses each having an individual press drive for cycling a slide in and out of a working area, and conveyors extending between the working areas of adjacent presses, the improvement comprising a conveyor control arrangement for a conveyor associated with each power press comprising:
(a) means for producing a timing signal representing successive increments of each press cycle of one of the presses;
(b) means for monitoring the position of the conveyor drive;
(c) a memory for storing data correlating desired positions for the conveyor with successive increments of each press cycle;
(d) means for deriving theoretical motion parameters for the conveyor from said timing signal and the data of the memory (c);
(e) means for comparing the theoretical motion derived by the means (d) with the motion monitored by the means (b); and
(f) means for controlling the motion of the conveyor drive based upon the results of the comparisons by the means (e).

14. In a press line for performing a series of press operations on a workpiece, including a series of power presses each having an individual press drive, press slide and working area, and each power press having an associated plurality of elements each having controlled motion in mechanisms for moving a workpiece relative to the working area of the press, the improvement comprising:
(a) a numerical control arrangement including means for controlling the motion of each of the elements associated with a particular power press in synchronization with the motion of that press according to stored data correlating desired positions for each of the elements with positions of the associated press drive and slide; and
(b) means for coordinating the motion of the elements of different power presses in the power press line.

15. The improvement of claim 14 in which the means (b) comprises means for synchronizing each of the power press drives.

16. A method of synchronizing the operation of auxiliary apparatus such as loaders, unloaders and conveyors with each of the press drives of a line of power presses comprising the steps of:
(a) deriving a set of auxiliary equipment position values for a cycle of a press drive;
(b) driving the press;
(c) continuously determining the position of the press drive;
(d) correlating successive press drive positions with the derived auxiliary equipment positions to continuously determine theoretical auxiliary equipment positions;
(e) continuously monitoring the position of the auxiliary equipment; and
(f) positioning the auxiliary equipment in said theoretical positions based upon the deviation between theoretical and actual auxiliary equipment position values.

17. A method of synchronizing the operation of auxiliary apparatus such as loaders, unloaders and conveyors with the press drives of each press of a line of power presses comprising the steps of:
(a) entering a set of discrete position locations corresponding to auxiliary equipment positions at specific points during a press drive cycle;
(b) deriving a larger set of position locations for the auxiliary equipment corresponding to press drive positions to form a table of auxiliary equipment position values;
(c) driving the press; and
(d) positioning the auxiliary equipment based upon said table of values during each cycle of press drive operation.

18. In a press line for performing a series of press operations on a workpiece including a series of power presses each having an individual press drive, slide and working area, an improved transfer mechanism arrangement comprising:
(a) a plurality of elements each having controlled motion in a mechanism for moving a workpiece relative to the working areas of the presses;
(b) means for monitoring parameters indicative of the press drive positions;
(c) means for monitoring the motion of each of the elements (b);
(d) a memory for storing data correlating desired positions for each of the elements (b) with the press drive position parameters;
(e) means for deriving theoretical motion parameters for each of the elements (b) from the press position parameters of the means (b) and the data of the memory (d);
(f) means for comparing the theoretical motion derived by the means (e) with the motion monitored by the means (c); and
(g) means for controlling the motion of each of the elements (b) based upon the results of the comparison by the means (f).

19. A method of controlling a workpiece handling mechanism associated with a power press having a slide mounted for controlled reciprocating movement along a selected axis, the workpiece handling mechanism being mounted for controlled movement along at least two different axes, said method comprising the steps of
producing signals representing the actual position of the workpiece handling mechanism along both its axes during the movement of said mechanism along said axes,
producing signals representing desired positions for said workpiece handling mechanism along both its axes at selected time intervals during a press cycle,
deriving from said time desired positions and said selected time intervals desired incremental positions for said workpiece handling mechanism along said axes at repetitive time increments within each of said selected intervals, utilizing said actual position signals and said desired incremental positions to produce a signal representing any error in the actual position of said mechanism in each of said repetitive time increments, deriving from said desired positions and said selected time intervals the desired velocity of movement of said workpiece handling mechanism along each of its axes within each selected time interval, driving said mechanism along each of said axes at a velocity which is a function of both said desired velocity and any position errors, and adjusting the duration of said time increments as a function of any position errors.

20. A method according to claim 19 which includes the steps of producing a signal representing a cumulative algebraic sum of said position errors, and adjusting the velocity of said mechanism as a function of said cumulative algebraic sum.

21. A method according to claim 19 which includes the steps of producing signals representing the actual position of the press drive during the reciprocating movement thereof, storing signals representing said desired positions for the workpiece handling mechanism correlated with the corresponding positions of the press drive at said selected time intervals, and producing said signals representing desired positions for the workpiece handling mechanism by retrieving said stored signals in response to said signals representing the actual position of the press drive at said selected time intervals.

22. A method of controlling a plurality of mechanisms associated with a power press and mounted for controlled movement along a plurality of different axes, said method comprising the steps of producing command signals numerically representing desired positions for said controlled mechanisms along each of said axes at selected intervals of press cycle, monitoring the actual positions of said controlled mechanisms along each of said axes, deriving from said command signals desired positions for said controlled mechanisms along each of said axes at repetitive time increments within each of said selected intervals, comparing the actual and desired positions of said controlled mechanisms along each of said axes in each of said repetitive time increments, and measuring any errors in said actual positions in each of said time increments, and adjusting the velocity of each mechanism for which a position error is measured in any of said repetitive time increments, whereby all the controlled mechanisms move in precise synchronism with each other along the respective paths defined by said command signals.

23. A method of controlling workpiece handling mechanisms for moving successive workpieces along multiple axes to load and unload a power press having a slide mechanism mounted for controlled reciprocating movement along a selected axis, said method comprising the steps of producing command signals numerically representing successive positions along a desired path for each of said mechanisms, said positions having preselected time intervals therebetween so that said command signals also represent desired velocities for each of said mechanisms along said desired paths to permit closely coordinated movement of the various mechanisms along intersecting paths, advancing each of said mechanisms along said desired path at said desired velocities in accordance with said command signals, monitoring the actual position of each of said mechanisms as they are advanced along said paths, and producing signals representing said actual positions, deriving from said command signals desired positions for each of said mechanisms at repetitive time increments within each of said preselected time intervals between the successive positions represented by said command signals, comparing the actual and desired positions of each of said mechanisms in each of said time increments, and measuring any errors in said actual positions with respect to said desired positions in each of said time increments, and adjusting the velocity of each mechanism for which a position error is measured in any of said repetitive time increments, whereby all said mechanisms are advanced along said desired paths in precise synchronism with each other and without interfering with each other.

* * * * *